(12) United States Patent
Hiraiwa et al.

(10) Patent No.: US 10,847,809 B2
(45) Date of Patent: Nov. 24, 2020

(54) SOLID-OXIDE-ELECTROLYSIS-CELL-TYPE HYDROGEN PRODUCTION APPARATUS

(71) Applicant: SUMITOMO ELECTRIC INDUSTRIES, LTD., Osaka (JP)

(72) Inventors: Chihiro Hiraiwa, Itami (JP); Takahiro Higashino, Itami (JP); Hiromasa Tawarayama, Itami (JP); Masatoshi Majima, Itami (JP); Toshihiro Yoshida, Osaka (JP); Kazunari Miyamoto, Itami (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/869,536

(22) Filed: May 7, 2020

(65) Prior Publication Data

US 2020/0266451 A1    Aug. 20, 2020

Related U.S. Application Data

(63) Continuation of application No. 16/073,380, filed as application No. PCT/JP2017/002122 on Jan. 23, 2017, now Pat. No. 10,693,143.

(30) Foreign Application Priority Data

Jan. 29, 2016    (JP) ................... 2016-016683

(51) Int. Cl.
    *H01M 4/88*    (2006.01)
    *H01M 8/0258*    (2016.01)
    (Continued)

(52) U.S. Cl.
    CPC ....... *H01M 4/8807* (2013.01); *H01M 4/8605* (2013.01); *H01M 8/0247* (2013.01);
    (Continued)

(58) Field of Classification Search
    CPC . H01M 2008/1293; H01M 2300/0074; H01M 4/8605; H01M 4/8807;
    (Continued)

(56) References Cited

U.S. PATENT DOCUMENTS

| 5,770,327 A | 6/1998 | Barnett et al. |
| 2004/0234836 A1 | 11/2004 | Orishima et al. |

(Continued)

FOREIGN PATENT DOCUMENTS

| JP | 2007-329063 A | 12/2007 |
| JP | 2008-235060 A | 10/2008 |

(Continued)

*Primary Examiner* — Adam A Arciero
(74) *Attorney, Agent, or Firm* — Faegre Drinker Biddle & Reath LLP

(57) ABSTRACT

A solid-oxide-electrolysis-cell-type hydrogen production apparatus includes a cell structure including a first electrode, a second electrode, and an electrolyte layer, a gas diffusion layer disposed adjacent to the first electrode, and a gas channel plate disposed adjacent to the gas diffusion layer, in which the gas diffusion layer is formed of a porous metal body having a three-dimensional mesh-like skeleton, the gas channel plate includes a first region including a first channel, a second region including a second channel, and a third region including a third channel, the first channel includes a slit extending from the center of the gas channel plate toward its outer edge at the boundary surface between the first region and the second region, letting the total area of the first channel at the boundary surface be a first opening area S1, letting the total area of the second channel at the boundary surface between the second region and the third region be a second opening area S2, and letting the total area of the third channel at the boundary surface between the third region and the gas diffusion layer be a third opening area S3, the relationship S2<S1<S3 is satisfied.

6 Claims, 19 Drawing Sheets

(51) Int. Cl.
    *H01M 8/2425* (2016.01)
    *H01M 8/2483* (2016.01)
    *H01M 8/0247* (2016.01)
    *H01M 4/86* (2006.01)
    *H01M 8/1213* (2016.01)
    *H01M 8/1246* (2016.01)
    *H01M 8/124* (2016.01)

(52) U.S. Cl.
    CPC ....... *H01M 8/0258* (2013.01); *H01M 8/1213* (2013.01); *H01M 8/1246* (2013.01); *H01M 8/2425* (2013.01); *H01M 8/2483* (2016.02); *H01M 2008/1293* (2013.01); *H01M 2300/0074* (2013.01)

(58) Field of Classification Search
    CPC ............. H01M 8/0247; H01M 8/0258; H01M 8/1213; H01M 8/1246; H01M 8/2425; H01M 4/2483
    See application file for complete search history.

(56) References Cited

U.S. PATENT DOCUMENTS

2015/0255812 A1    9/2015    Uwani
2016/0079617 A1*  3/2016    Heiredal-Clausen ..... C25B 9/18
                                                                  429/454

FOREIGN PATENT DOCUMENTS

JP          2012-174626 A    9/2012
WO     WO 03/012903 A1   2/2003

* cited by examiner

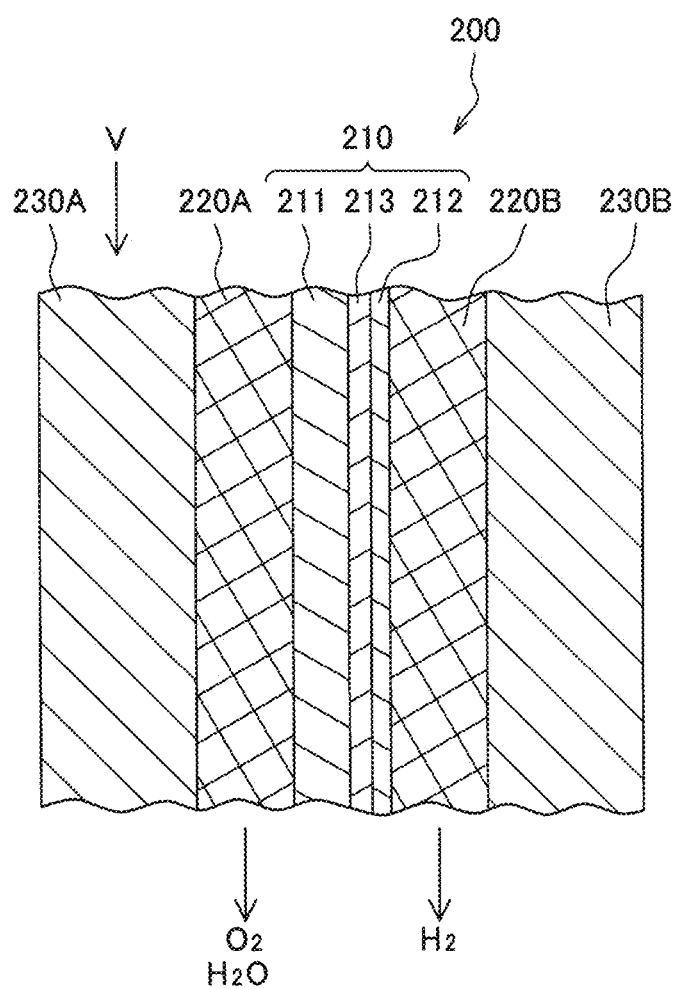

SOLID-OXIDE-ELECTROLYSIS-CELL-TYPE HYDROGEN PRODUCTION APPARATUS

This application is a continuation of U.S. application Ser. No. 16/073,380 filed on Jun. 27, 2018, which is the U.S. National Stage of International Application No. PCT/JP2017/002122 filed on Jan. 23, 2017, the entire contents of which are incorporated herein by reference. The International Application claims priority to Japanese Patent Application No. 2016-016683 filed in the Japan Patent Office on Jan. 29, 2016, the entire contents of which is incorporated herein by reference.

TECHNICAL FIELD

The present invention relates to a solid-oxide-electrolysis-cell-type hydrogen production apparatus.

BACKGROUND ART

Fuel cells are devices that generate electricity through electrochemical reactions between fuel gases such as hydrogen and air (oxygen). Fuel cells can directly convert chemical energy into electricity and thus have high power generation efficiency. In particular, solid oxide fuel cells (hereinafter, referred to as "SOFCs"), which operate at temperatures of 1,000° C. or lower, hold promise because of their high reaction rates. SOFCs include a cell structure in which an electrolyte layer containing a solid oxide and two electrodes formed of a ceramic material (sintered body) are integrated together. That is, the cell structure is formed of all the solid elements; thus, SOFCs are easy to handle.

To supply a fuel gas or air to a cell structure, a fuel cell usually includes a gas channel provided in an interconnector adjacent to the cell structure. For example, PTL 1 discloses a method for forming dimples serving as gas channels on an interconnector by, for example, etching.

CITATION LIST

Patent Literature

PTL 1: International Publication No. 2003/12903

SUMMARY OF INVENTION

An aspect of the present invention relates to a fuel cell including a cell structure including a first electrode, a second electrode, and an electrolyte layer interposed between the first electrode and the second electrode, the electrolyte layer containing an ionically conductive solid oxide; a gas diffusion layer having a pair of main surfaces facing away from each other, the gas diffusion layer being disposed adjacent to the first electrode, a first main surface of the pair of main surfaces facing the first electrode, the gas diffusion layer supplying a gas to the first electrode; and a gas channel plate having a pair of plate surfaces facing away from each other, the gas channel plate being disposed adjacent to the gas diffusion layer, a first plate surface of the pair of plate surfaces facing a second main surface of the gas diffusion layer, the gas channel plate supplying the gas to the gas diffusion layer, in which the gas diffusion layer is formed of a porous metal body having a three-dimensional mesh-like skeleton, the gas channel plate includes a first region, a second region, and a third region, the first region, the second region, and the third region are arranged in order of the first region, the second region, and the third region from a second plate surface of the gas channel plate toward the first plate surface of the gas channel plate in a thickness direction, a first channel extending through the first region in the thickness direction of the gas channel plate is provided in the first region, a second channel extending through the second region in the thickness direction of the gas channel plate is provided in the second region, a third channel extending through the third region in the thickness direction of the gas channel plate is provided in the third region, the first channel extends to the second plate surface of the gas channel plate and communicates with the second channel, the second channel communicates with the third channel, the third channel extends to the first plate surface of the gas channel plate and communicates with the gas diffusion layer, the first channel includes a slit extending from the center of the first plate surface toward its outer edge at the boundary surface between the first region and the second region when viewed in the normal direction to the first plate surface, letting the total area of the first channel at the boundary surface between the first region and the second region when viewed in the normal direction be a first opening area S1, letting the total area of the second channel at the boundary surface between the second region and the third region when viewed in the normal direction be a second opening area S2, and letting the total area of the third channel at the boundary surface between the third region and the second main surface of the gas diffusion layer when viewed in the normal direction be a third opening area S3, the relationship S2<S1<S3 is satisfied.

BRIEF DESCRIPTION OF DRAWINGS

FIG. 6 is a schematic cross-sectional view illustrating the structure of a main portion of a hydrogen production apparatus using an SOEC process.

DESCRIPTION OF EMBODIMENTS

Problem to be Solved by Disclosure

Figure 1:
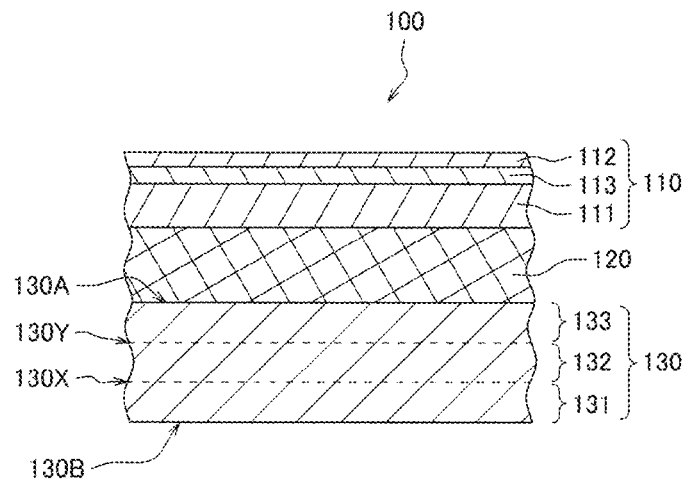
FIG. 1 is a schematic cross-sectional view illustrating a main portion of a fuel cell according to an embodiment of the present invention.

In PTL 1, a gas flows from the center of the interconnector toward its outer edge through complex channels. This causes a marked pressure drop of a gas by the time the gas reaches the outer edge of the interconnector. The gas tends to concentrate and flow through a portion where the gas flows easily. Thus, most of the gas flows from the center to a cell structure without diffusing to the outer edge of the interconnector. That is, the gas is not sufficiently diffused with the interconnector and is locally supplied to the cell structure, thus decreasing the power generation efficiency.

Like PTL 1, in the case where complex gas channels are formed in an interconnector by, for example, etching, the productivity of the interconnector is low. Typically, a fuel cell includes stacked cells (for example, 50 cells or more), each of the cells serving as a structural unit and including a cell structure and an interconnector. Thus, an increase in processing cost per cell due to the decrease in interconnector productivity markedly increases the cost of the fuel cell.

Advantageous Effects of Disclosure

According to the present invention, a solid oxide fuel cell (SOFC) having good gas diffusion performance is provided.

Description of Embodiments of Invention

Embodiments of the present invention are first listed and explained.

(1) A fuel cell of the present invention includes a cell structure including a first electrode, a second electrode, and an electrolyte layer interposed between the first electrode and the second electrode, the electrolyte layer containing an ionically conductive solid oxide; a gas diffusion layer having a pair of main surfaces facing away from each other, the gas diffusion layer being disposed adjacent to the first electrode, a first main surface of the pair of main surfaces facing the first electrode, the gas diffusion layer supplying a gas to the first electrode; and a gas channel plate having a pair of plate surfaces facing away from each other, the gas channel plate being disposed adjacent to the gas diffusion layer, a first plate surface of the pair of plate surfaces facing a second main surface of the gas diffusion layer, the gas channel plate supplying the gas to the gas diffusion layer, in which the gas diffusion layer is formed of a porous metal body having a three-dimensional mesh-like skeleton, the gas channel plate includes a first region, a second region, and a third region, the first region, the second region, and the third region are arranged in order of the first region, the second region, and the third region from a second plate surface of the gas channel plate toward the first plate surface of the gas channel plate in the thickness direction, a first channel extending through the first region in the thickness direction of the gas channel plate is provided in the first region, a second channel extending through the second region in the thickness direction of the gas channel plate is provided in the second region, a third channel extending through the third region in the thickness direction of the gas channel plate is provided in the third region, the first channel extends to the second plate surface of the gas channel plate and communicates with the second channel, the second channel communicates with the third channel, the third channel extends to the first plate surface of the gas channel plate and communicates with the gas diffusion layer, the first channel includes a slit extending from the center of the first plate surface toward the outer edge of the first plate surface at the boundary surface between the first region and the second region when viewed in the normal direction to the first plate surface, letting the total area of the first channel at the boundary surface between the first region and the second region when viewed in the normal direction be a first opening area S1, letting the total area of the second channel at the boundary surface between the second region and the third region when viewed in the normal direction be a second opening area S2, and letting the total area of the third channel at the boundary surface between the third region and the second main surface of the gas diffusion layer when viewed in the normal direction be a third opening area S3, the relationship S2<S1<S3 is satisfied.

The gas channel plate is disposed in order to sufficiently preliminarily diffuse the gas by the time the gas reaches the gas diffusion layer. The use of the gas channel plate having the foregoing structure can inhibit variations in the pressure of the gas in a planar direction, the gas flowing from the gas channel plate to the gas diffusion layer.

(2) The second channel preferably has a spot shape at the boundary surface between the second region and the third region when viewed in the normal direction to the first plate surface. In this case, the pressure of the gas flowing from second openings to the third region is increased. This further inhibits the variations in the pressure of the gas in the planar direction, the gas flowing from the gas channel plate to the gas diffusion layer.

(3) In the case where a region including a central point of the first plate surface of the gas channel plate is defined as a central portion, the region being surrounded by a figure formed by connecting points, the points lying on freely-selected straight lines drawn by connecting the central point and the outer edge, each of the points being located away from the central point by ¼ of a length of a corresponding one of the straight lines, letting the ratio of the opening area of the third channel in the central portion to the area of the central portion be $R_{in}$ and letting the ratio of the opening area of the third channel in an outer portion other than the central portion of the first plate surface of the gas channel plate to the area of the outer portion be $R_{out}$, the relationship 0.8 $R_{in}/R_{out}$ 1.2 is preferably satisfied. Third openings are uniformly provided on the entire first plate surface, so that the gas is supplied to the gas diffusion layer while being sufficiently preliminarily diffused.

(4) Preferably, the first region is formed of a first plate-like member, the second region is formed of a second plate-like member, the third region is formed of a third plate-like member, and the gas channel plate is formed of a stack of the first plate-like member, the second plate-like member, and the third plate-like member. In this case, the channels are easily formed at a low processing cost.

(5) The porous metal body preferably has a porosity of 85% or more by volume. In this case, the gas diffusivity should be further improved, so that the gas can be supplied to the entire surface of the first electrode in high uniformity.

(6) The first electrode is preferably an anode. When the anode is supplied with a fuel gas, a reduction reaction occurs. The reduction reaction results in a slight decrease in the volume of the anode due to shrinkage. If the anode shrinks unevenly, stress concentrates on a portion of the anode that shrinks greatly; thus, the cell structure may be damaged. The gas diffusion layer and the gas channel plate are arranged so as to face the anode, so that the gas is supplied to the entire anode in high uniformity. Thus, the anode shrinks evenly to easily inhibit damage to the cell structure.

Details of Embodiments of Invention

Embodiments of the present invention will be specifically described below. The present invention is not limited to the following description. The scope of the present invention is defined by the following claims and is intended to include any modifications within the scope and meaning equivalent to the scope of the claims.

A fuel cell according to an embodiment will be described below with reference to the drawings.

Figure 2:
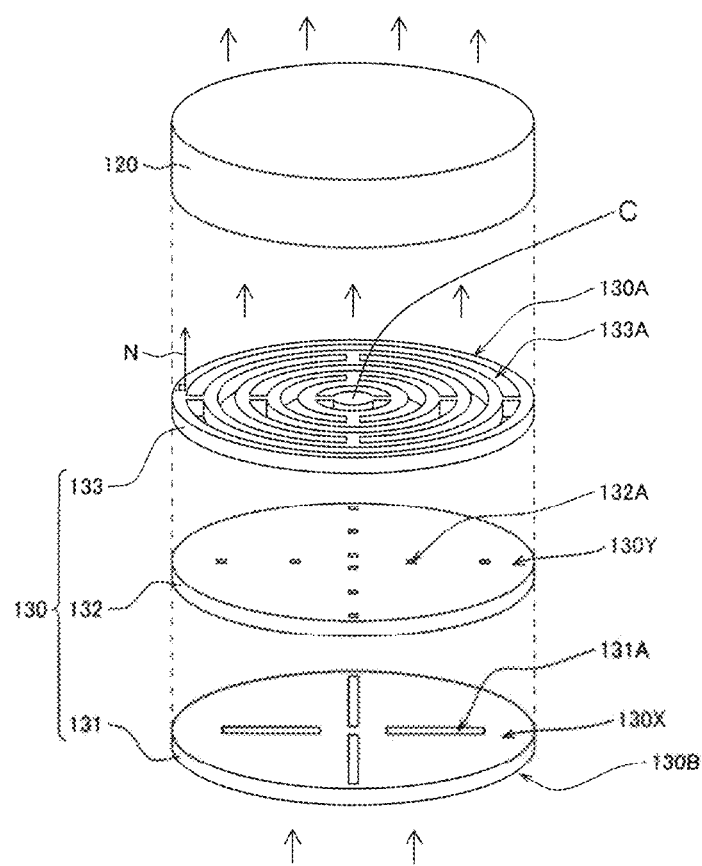
FIG. 2 is an exploded perspective view illustrating the structure of a gas diffusion layer and a gas channel plate according to an embodiment of the present invention.

As illustrated in FIG. 1, a fuel cell 100 includes a cell structure 110 including a first electrode 111, a second electrode 112, and an electrolyte layer 113 interposed between the first electrode 111 and the second electrode 112, a gas diffusion layer 120 facing the first electrode 111, and a gas channel plate 130 facing the gas diffusion layer 120. FIG. 1 is a schematic cross-sectional view illustrating the fuel cell 100 according to an embodiment. FIG. 2 is an exploded perspective view illustrating an example of the structure of the gas channel plate 130 and the gas diffusion layer 120. FIGS. 3A to 3C, 4A to 4C, and 5A to 5C are top views illustrating the respective regions of the gas channel plate 130. In the figures, the same numerals denote elements having the same functions.

The gas channel plate 130 and the gas diffusion layer 120 have the function of supplying a gas supplied from a manifold, not illustrated, to the first electrode 111 while the gas is diffused. The gas channel plate 130 is disposed so as to face the gas diffusion layer 120 in order to supply the gas to the gas diffusion layer 120. The gas diffusion layer 120 is disposed so as to face the first electrode 111 in order to supply the gas to the first electrode 111.

(Gas Channel Plate)

The gas channel plate 130 is a member that supplies the gas to the gas diffusion layer 120. The gas channel plate 130 supplies the gas diffusion layer 120 with the gas uniformly diffused in the planar direction of the gas diffusion layer 120 (by extension, in the planar direction of the fuel cell 100) while an increase in the pressure drop of the gas is inhibited. The pressure drop of the gas across the gas channel plate 130 is preferably lower than the pressure drop of the gas across the gas diffusion layer 120. The pressure drop of the gas across the gas channel plate 130 is, for example, less than 50% of the pressure drop in the gas diffusion layer 120. The gas channel plate 130 can function as an interconnector of the fuel cell 100.

The gas channel plate 130 includes a first region 131, a second region 132, and a third region 133, which are disposed so as to divide the thickness of the gas channel plate 130, arranged in this order from a plate surface 130B facing away from the gas diffusion layer 120. The gas channel plate 130 has a substantially constant thickness. That is, a plate surface 130A of the gas channel plate 130 facing the gas diffusion layer 120 is substantially parallel to the plate surface 130B facing away from the plate surface 130A. The entire plate surface 130A and the entire plate surface 130B are opposite to each other. Furthermore, the boundary surface 130X between the first region 131 and the second region 132 when viewed in the normal direction N of the plate surface 130A and the boundary surface 130Y between the second region 132 and the third region 133 when viewed in the normal direction N are preferably opposite to the entire plate surface 130A and the entire plate surface 130B in view of a pressure drop.

The first region 131 includes a first channel 131A. The second region 132 includes a second channel 132A. The third region 133 includes a third channel 133A. The channels extend through the regions in the thickness direction of the gas channel plate 130. The first channel 131A opens on the plate surface 130B of the gas channel plate 130 and communicates with the second channel 132A. The second channel 132A communicates with the third channel 133A. The third channel 133A opens on the plate surface 130A of the gas channel plate 130 and is connected to the gas diffusion layer 120. Thus, the gas supplied from the manifold passes through, in sequence, the first channel 131A, the second channel 132A, and the third channel 133A and is supplied to the gas diffusion layer 120.

The channels are provided in such a manner that different flow rates and different flow directions of the gas are obtained in different regions. In this way, by dividing the gas channel plate 130 into the regions in the thickness direction and arranging the channels having different functions in different regions, the gas passing through short paths is diffused in high uniformity onto the entire plate surface 130A. In addition, variations in the pressure of the gas, flowing from the plate surface 130A, in the planar direction are inhibited. This mechanism will be described below.

The boundary surface 130X and the boundary surface 130Y can be determined by, for example, the cross-sectional shape and the area of the channels when viewed in the normal direction N. As described below, when the gas channel plate includes plate-like members, each of the plate-like members can be regarded as a corresponding one of the regions. The cross-sectional shape and the area of the first channel 131A provided in the first region 131 are largely unchanged. For example, the rate of change of the cross-sectional area of the first channel 131A when viewed in the normal direction N is 10% or less. The same is true for the second channel 132A and the third channel 133A.

The regions can be identified as described below on the basis of, for example, the cross-sectional shape and the area of each of the channels when viewed in the normal direction N. The first region 131 differs from the second region 132 in the cross-sectional shape and the area of the channel. Thus, a region including a slit extending from the center of the plate surface 130A toward its outer edge when viewed in the normal direction N can be identified as the first region 131. A region that is adjacent to a side of the first region 131 adjacent to the gas diffusion layer 120 and that does not include the slit when viewed in the normal direction N can be identified as the second region 132. Alternatively, a region that is adjacent to the side of the first region 131 adjacent to the gas diffusion layer 120 and that includes a channel having a cross-sectional area 60% smaller than the cross-sectional area of the first channel 131A provided in the first region 131 can be identified as the second region 132. The boundary surface between the first region 131 and the second region 132, the boundary surface being parallel to the plate surface 130A, is defined as the boundary surface 130X.

The second region 132 differs from the third region 133 in the cross-sectional area. For example, when a change in the cross-sectional area of the channels provided in the gas channel plate 130 is sequentially calculated from a surface (plate surface 130A) of the gas channel plate 130 facing the gas diffusion layer 120 toward a surface (plate surface 130B) facing away from the plate surface 130A, a plane, parallel to the plate surface 130A, in which the cross-sectional area is 20% of the total area of openings (third openings 133a) provided on the plate surface 130A is identified as the boundary surface 130Y between the second region 132 and the third region 133. In this case, a region extending from the boundary surface 130Y to the gas diffusion layer 120 is the third region 133, and a region extending from the boundary surface 130Y to the boundary surface 130X is the second region 132.

In an embodiment illustrated in the figure, although the shape of the plate surfaces 130A and 130B of the gas channel plate 130 and the main surfaces of the gas diffusion layer 120 is a circle, the shape is not limited thereto. Examples of the shape of the plate surfaces 130A and 130B of the gas channel plate 130 and the main surfaces of the gas diffusion layer 120 may include rectangles, ellipses, polygons, and indefinite shapes.

(First Region)

The first region 131 is supplied with the gas from the manifold. The first region 131 plays a role in supplying the gas to the second region 132 while the gas supplied is forcefully diffused from the center of the first region 131 to its outer edge or from the outer edge of the first region 131 to its center. That is, the first channel 131A when viewed in the normal direction N includes a slit extending from the center of the plate surface 130A toward its outer edge at the boundary surface 130X between the first region and the second region. In other words, at least an opening of the first channel 131A is provided at the boundary surface 130X, the opening having a slit-like shape and extending from the center of the plate surface 130A toward its outer edge. An opening having another shape or extending in a different direction from the foregoing direction may be provided at the boundary surface 130X. Hereinafter, the opening extending from the center of the plate surface 130A toward its outer edge and having a slit-like shape and an opening provided at the boundary surface 130X as needed are collectively referred to as first openings 131a.

The term "slit shape" (or the slit) refers to a shape in which when a minimum rectangle surrounding each of the first openings 131a is imaginarily drawn, the ratio of the length of a freely-selected side of the rectangle to the length of a side perpendicular to the side, the two sides having a common vertex, is more than two. In this case, the longitudinal direction of the minimum rectangle surrounding each of the first openings 131a is a direction from the center of the plate surface 130A toward its outer edge. The direction from the center of the plate surface 130A toward its outer edge refers to a direction of a straight line connecting a freely-selected point in the central portion including the central point C of the plate surface 130A and the outer edge. In this case, the straight line connecting the freely-selected point in the central portion and the outer edge need not pass through the central point C.

The central portion including the central point C of the plate surface 130A is defined as a region including the central point C, the region being surrounded by a figure (similar to the plate surface 130A) formed by connecting points, the points lying on freely-selected straight lines that connect the central point C of the plate surface 130A and the outer edge, each of the points being located away from the central point by ¼ of the length of a corresponding one of the straight lines.

When the shape of the plate surface 130A is a circle, the central point C of the plate surface 130A is the midpoint of the diameter of the circle. When the shape of the plate surface 130A is an ellipse, the central point C is the midpoint of the major axis and the minor axis. When the shape of the plate surface 130A is a shape having point symmetry (for example, a rectangle) other than circles or ellipses, the central point C is a point of intersection of the diagonals. When the plate surface 130A has a shape other than those described above, if the gas channel plate 130 is assumed to have uniform density, the central point C can be regarded as the center of gravity G of the gas channel plate 130.

The outer shape of the first openings 131a is not particularly limited and may be a rectangle or another shape. For example, the center line of each of the first openings 131a may be a straight line, curved line such as an arc or a wave form, or a combination thereof. The center line of each first opening 131a refers to a bisector of the corresponding first opening 131a in the lateral direction. The width of each first opening 131a in the lateral direction and the longitudinal direction may be constant or need not be constant.

The arrangement of the first openings 131a is not particularly limited as long as the first channel 131A communicates with the second channel 132A and extends from the center of the plate surface 130A toward its outer edge. In particular, the first openings 131a are preferably located at positions corresponding to the second channel 132A in view of a pressure drop.

The length of the minimum rectangle surrounding each of the first openings 131a in the longitudinal direction (direction connecting the center of the plate surface 130A and its outer edge) is not particularly limited. The length of each first opening 131a in the longitudinal direction may be equal to or shorter than the length from the central point C of the plate surface 130A to its outer edge. The first openings 131a that are shorter than the length from the central point C of the plate surface 130A to its outer edge may be arranged on any straight line connecting the center of the plate surface 130A and its outer edge. In particular, in order to diffuse the gas to the outer edge of the plate surface 130A, the length of each first opening 131a in the longitudinal direction is preferably ½ or more of a length from the central point C of the plate surface 130A to its outer edge (when the shape of the plate surface 130A is a circle, the length is its radius).

The percentage of the total area (first opening area S1) of the first openings 131a with respect to the plate surface 130A is not particularly limited. From the viewpoint of more uniformly diffusing the gas to the entire outer edge of the plate surface 130A, the percentage is preferably, for example, 3% to 50%.

Figure 3A:
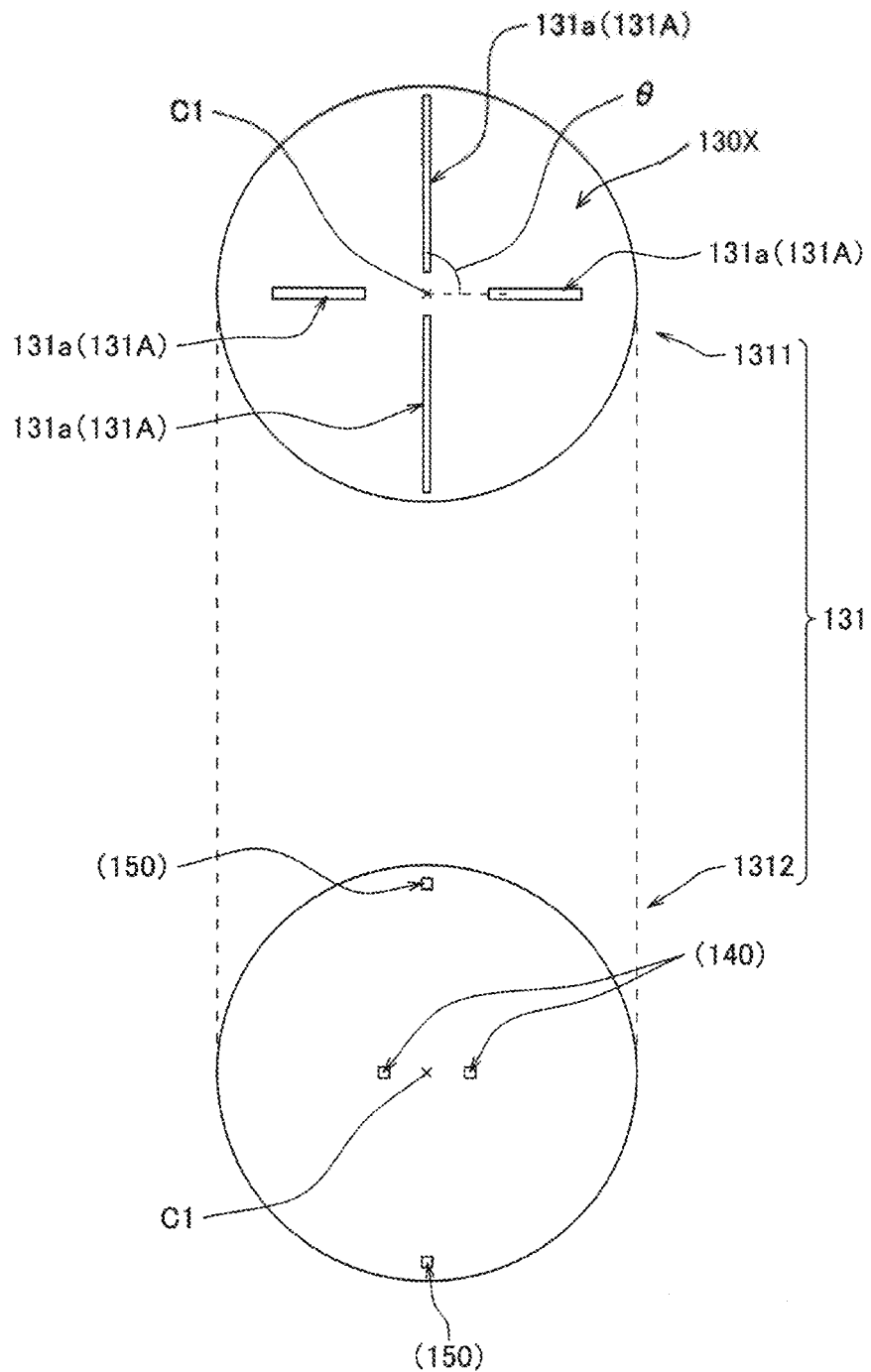
FIG. 3A is a top view illustrating a first region according to an embodiment of the present invention.
Figure 3B:
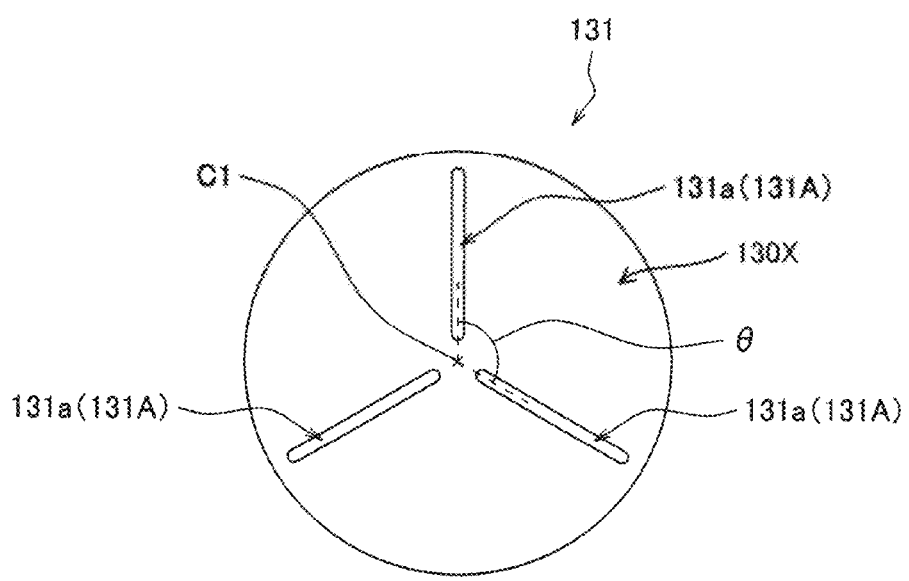
FIG. 3B is a top view illustrating a first region according to another embodiment of the present invention.

FIGS. 3A and 3B illustrate the first openings 131a provided radially from the center of the plate surface 130A toward its outer edge. In each figure, a point C1 in the first region 131 corresponds to the central point C. When the first openings 131*a* are provided radially, an angle θ formed by center lines of minimum rectangles surrounding adjacent first openings 131*a* is preferably 120° or less. In this case, the gas is diffused in high uniformity to the entire surface of the third region 133 through the second region 132. FIG. 3A illustrates the case of an angle θ of 90°. FIG. 3B illustrates the case of an angle θ of 120°. FIGS. 3A and 3B each are a top view of the first region 131 when viewed from the boundary surface 130X side.

In FIG. 3A, the first region 131 is divided into two regions. One region is a region (formation region 1311) where the first channel 131A is provided. The other region is a region (reception region 1312) where the first channel 131A is not provided. The reception region 1312 is located on the opposite side of the first region 131 from the second region 132 and, for example, is a region that directly receives the gas from the manifold. The reception region 1312 includes inlets 140 extending through the reception region 1312. The inlets 140 communicate with the first channel 131A. The first channel 131A opens on the plate surface 130B through the inlets 140. The inlets 140 may be located at positions corresponding to the first channel 131A. As described below, a three-dimensional mesh-like porous metal body used as the gas diffusion layer 120 has relatively long paths through which the gas passes. Thus, the three-dimensional mesh-like porous metal body enables the gas to be retained in the first region 131 for a long time. Therefore, even if the inlets 140 are located at the positions corresponding to the first channel 131A, the gas is easily diffused toward the outer edge of the plate surface 130A.

The reception region 1312 may further include outlets 150 to discharge the gas to anther manifold. In this case, the gas supplied from the manifold is supplied to the first electrode 111 through the reception region 1312, the formation region 1311 including the first channel 131A, the second region 132, the third region 133, and the gas diffusion layer 120 and is partially consumed. The remainder that has not been consumed passes through the gas diffusion layer 120, the third region 133, the second region 132, and the formation region 1311 and is discharged from the outlets 150 in the reception region 1312 to another manifold.

Figure 3C:
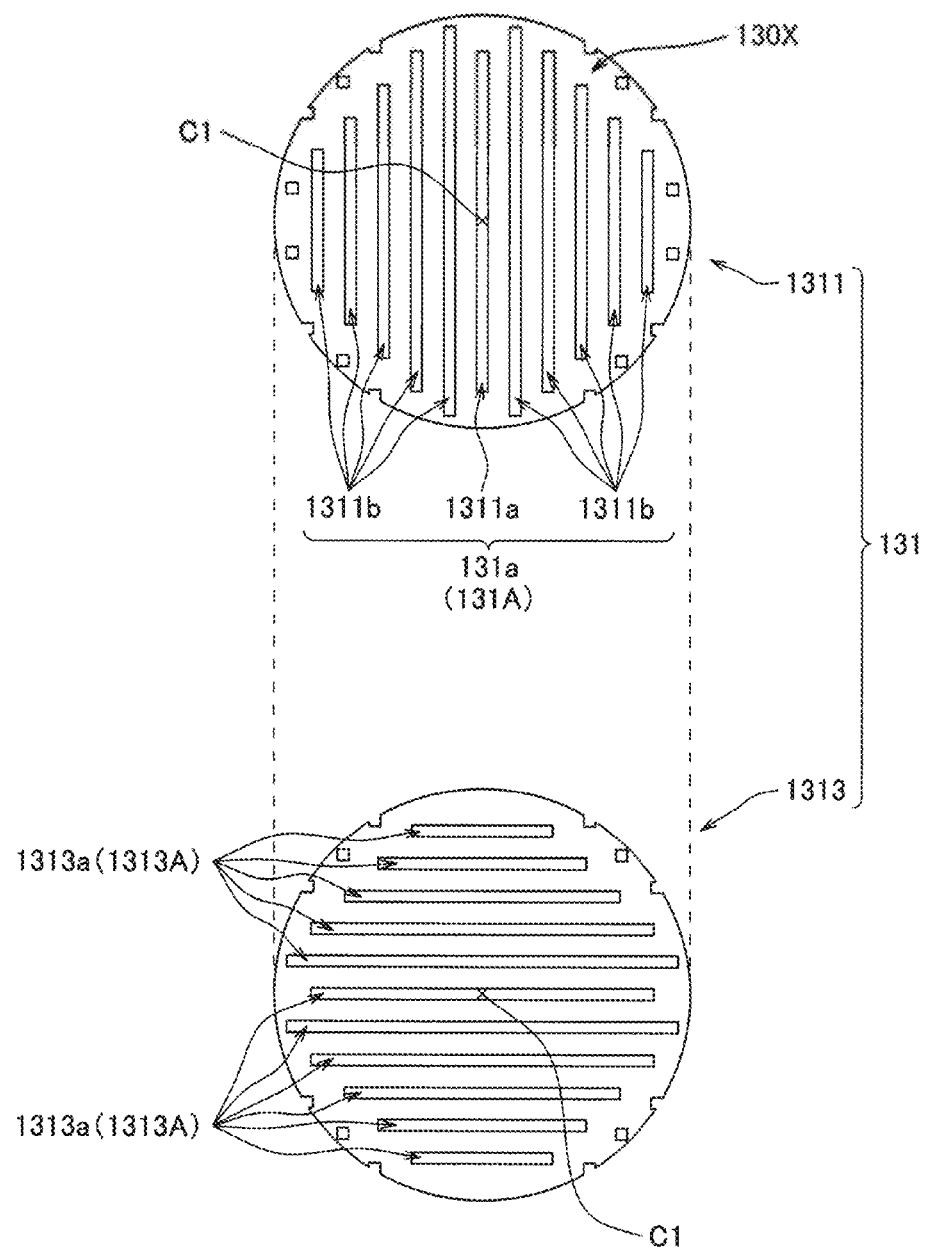
FIG. 3C is a top view illustrating a first region according to another embodiment of the present invention.

FIG. 3C illustrates the case of the first openings 131*a* including the point C1, a slit 1311*a* extending from the center of the plate surface 130A toward its outer edge in one direction, and slits 1311*b* that extend parallel to the slit 1311*a* and that are arranged at predetermined spacings from the slit 1311*a*.

In FIG. 3C, the first openings 131*a* extend in only one direction on the plate surface 130A. In this case, the first region 131 is further divided into two regions. One region is a region (formation region 1311) where the first channel 131A is provided. The other region is a region (auxiliary region 1313) where an auxiliary channel 1313A is provided in place of the first channel 131A. The auxiliary region 1313 is provided on the plate surface 130B side of the formation region 1311.

The auxiliary channel 1313A includes slit-like openings (auxiliary openings 1313*a*) extending in a direction different from the first openings 131*a* (1311*a* and 1311*b*) at a boundary surface with the formation region 1311. The auxiliary channel 1313A communicates with the first channel 131A. The first channel 131A opens on the plate surface 130B through the auxiliary channel 1313A. A minimum angle formed by center lines of minimum rectangles surrounding the auxiliary openings 1313*a* of the auxiliary channel 1313A and center lines of minimum rectangles surrounding the first openings 131*a* is preferably in the range of 30° to 90° at the boundary surface between the formation region 1311 including the first channel 131A and the auxiliary region 1313. This inhibits the diffusion of the gas in only one direction and facilitates the diffusion of the gas to the entire outer edge of the boundary surface 130X.

The auxiliary openings 1313*a* may extend randomly in directions different from the first openings 131*a* or may extend parallel to each other as illustrated in FIG. 3C. The auxiliary openings 1313*a* are preferably parallel to each other from the viewpoint of easily controlling the flow of the gas. A plurality of the auxiliary regions 1313 may be provided as needed. However, a smaller number thereof is desired (for example, three layers or less). This is because the thickness of the fuel cell 100 is increased. The percentage of the total area of the auxiliary openings 1313*a* with respect to the plate surface 130A is preferably 10% to 50%, more preferably 20% to 40%.

(Second Region)

The second region 132 plays a role in supplying the gas, which is diffused toward the outer edge of the plate surface 130A owing to the first region 131, to the gas diffusion layer 120 at a high pressure through the third region 133.

Figure 4A:
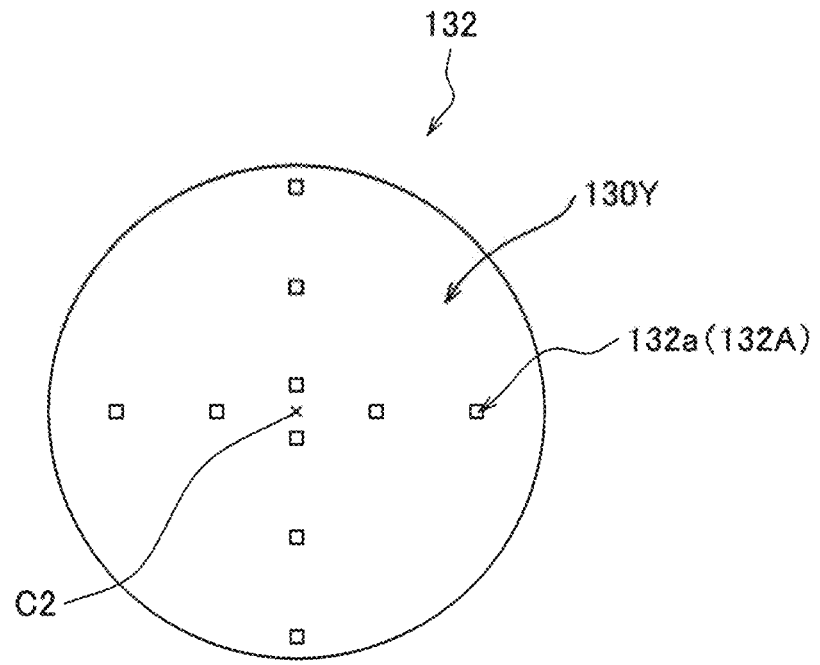
FIG. 4A is a top view illustrating a second region according to an embodiment of the present invention.
Figure 4B:
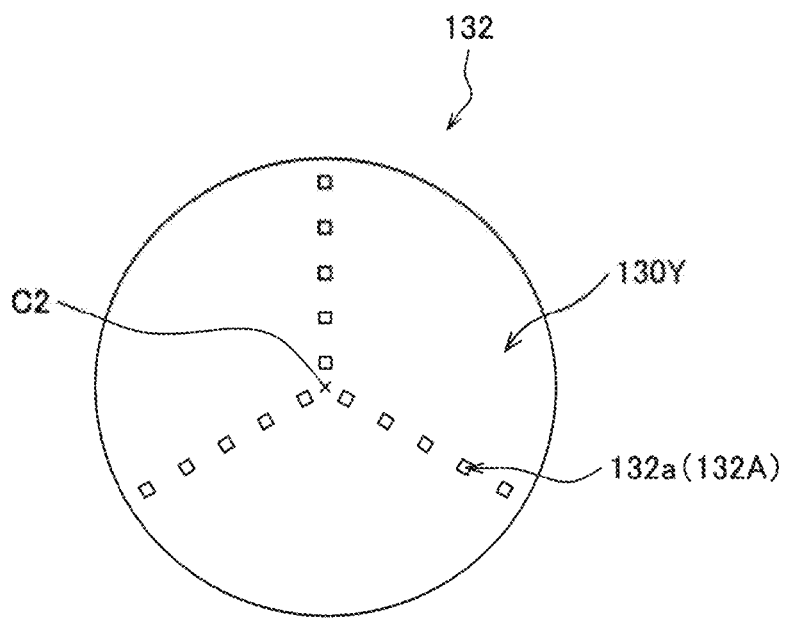
FIG. 4B is a top view illustrating a second region according to another embodiment of the present invention.
Figure 4C:
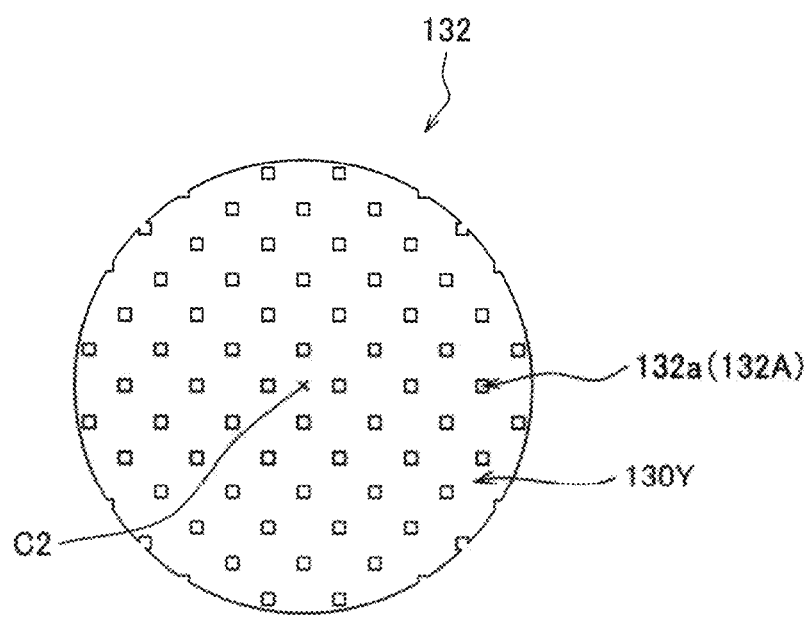
FIG. 4C is a top view illustrating a second region according to another embodiment of the present invention.
Figure 5A:
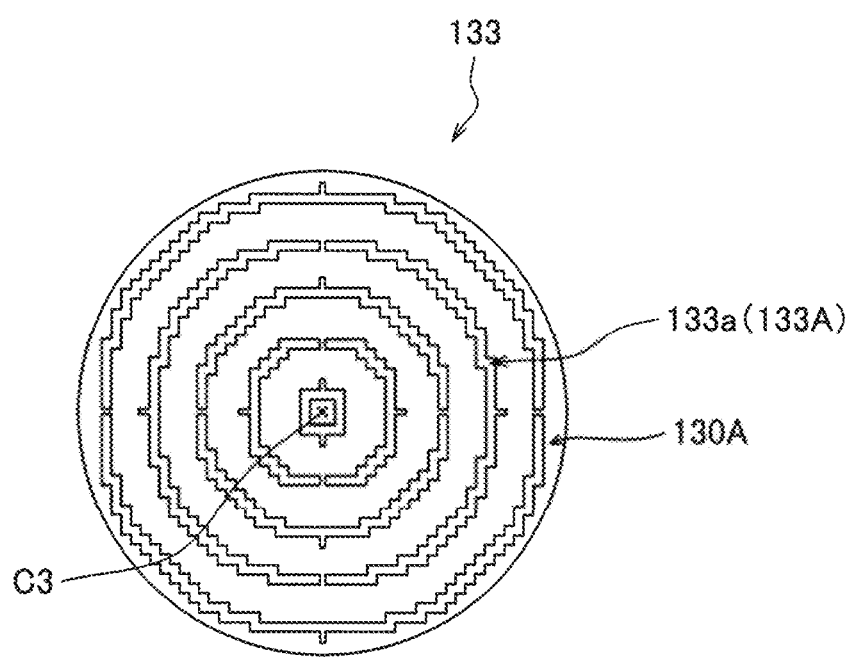
FIG. 5A is a top view illustrating a third region according to an embodiment of the present invention.
Figure 5B:
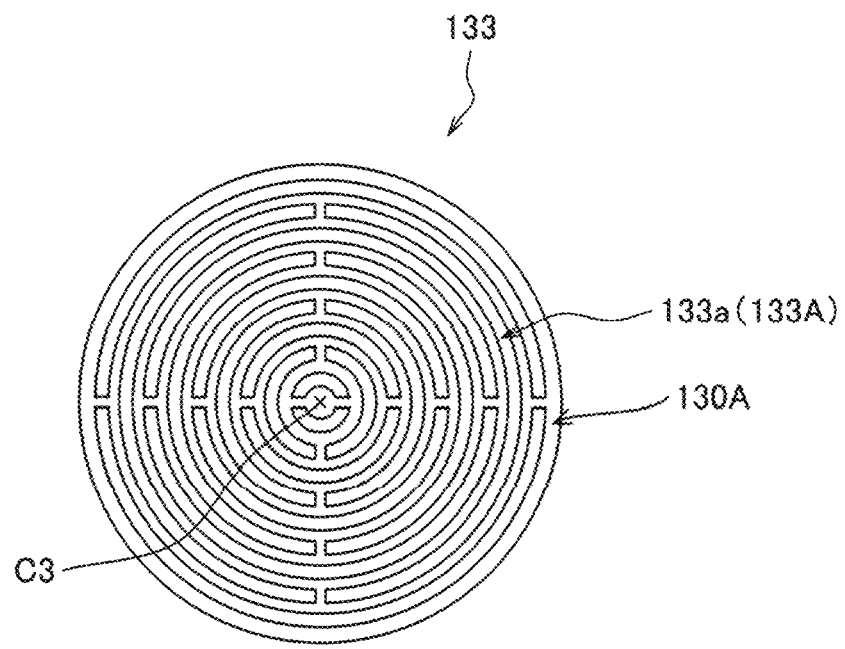
FIG. 5B is a top view illustrating a third region according to another embodiment of the present invention.
Figure 5C:
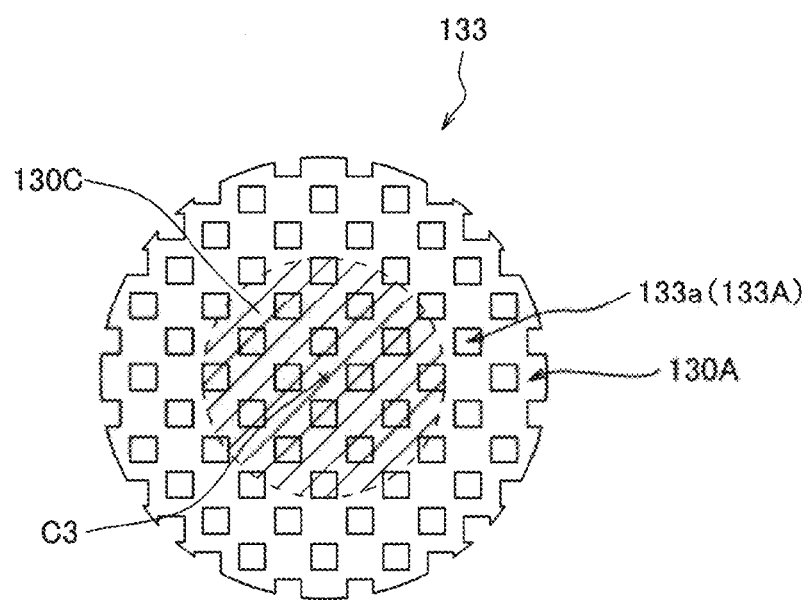
FIG. 5C is a top view illustrating a third region according to another embodiment of the present invention.

Thus, the total area (second opening area S2) of openings (second openings 132*a*, see FIGS. 4A to 4C) of the second channel 132A at the boundary surface 130Y is smaller than the total area (third opening area S3) of openings (third openings 133*a*, see FIGS. 5A to 5C) of the third channel 133A at the boundary surface (i.e., the plate surface 130A) between the third region 133 and the gas diffusion layer 120 (S2<S3). Because the upstream second opening area S2 is smaller than the downstream third opening area S3, the gas with a high pressure flows from the second region 132 to the gas diffusion layer 120 through the third region 133. In particular, the second opening area S2 is preferably ⅟₅₀ to ⅕ of the third opening area S3. FIGS. 4A to 4C are top views each illustrating the second region 132 when viewed from the boundary surface 130Y side. FIGS. 5A to 5C are top views each illustrating the third region 133 when viewed from the plate surface 130A side.

Furthermore, the second region 132 plays a role in allowing the gas to be retained in the first region 131 for a long time.

The gas supplied to the first region 131 is sufficiently diffused from the center of the plate surface 130A toward its outer edge. Thus, the second opening area S2 is smaller than the total area of the first openings 131*a* (first opening area S1) at the boundary surface 130X (S2<S1). Because the downstream second opening area S2 is smaller than the upstream first opening area S1, the gas is allowed to be temporarily retained on the upstream side. At this time, the gas is diffused toward the outer edge of the plate surface 130A along the first openings 131*a* on the boundary surface 130X. Furthermore, the pressure of the gas flowing from the first openings 131*a* is uniformized at the entire boundary surface 130X. In particular, the second opening area S2 is preferably ⅟₂₀ to ½ of the first opening area S1.

The shape of the second openings 132*a* is not particularly limited and is preferably a spot shape in consideration of the roles of the second region 132 described above. The term "spot shape" refers to a shape in which when a minimum rectangle surrounding each of the second openings 132*a* is imaginarily drawn, the ratio of the length of a freely-selected side of the rectangle to the length of a side perpendicular to the side, the two sides having a common vertex, is two or less. The outer shape of the second openings 132*a* is not particularly limited. Examples thereof include circles, ellipses, polygons, and star shapes.

The arrangement of the second openings 132a is not particularly limited as long as the second channel 132A communicates with the first channel 131A and the third channel 133A. In particular, the second openings 132a are preferably located at positions corresponding to the third channel 133A in view of a pressure drop. Furthermore, because the gas is easily diffused to the entire surface of the third region 133, the second openings 132a are preferably arranged at least in the vicinity of a point C2 on the boundary surface 130A and in the vicinity of the outer edge. The point C2 corresponds to the central point C of the plate surface 130A.

FIGS. 4A to 4C illustrate preferred arrangement of the second openings 132a. FIG. 4A illustrates the case where the second openings 132a having a spot shape are arranged in a cross shape and in the vicinity of the point C2 and the outer edge of the boundary surface 130Y. In FIG. 4A, the second openings 132a are located at positions corresponding to the first openings 131a illustrated in FIG. 3A.

FIG. 4B illustrates the case where the second openings 132a having a spot shape are arranged in the vicinity of the point C2 and the outer edge of the boundary surface 130Y and along lines dividing a circle into three parts. In FIG. 4B, the second openings 132a are located at positions corresponding to the first openings 131a illustrated in FIG. 3B. FIG. 4C illustrates the case where the second openings 132a having a spot shape are arranged on the entire boundary surface 130Y. In FIG. 4C, the second openings 132a are located at positions corresponding to the first openings 131a (1311a and 1311b) illustrated in FIG. 3C. However, the arrangement of the second openings 132a is not limited thereto.

The percentage of the second opening area S2 with respect to the plate surface 130A is not particularly limited and is preferably, for example, 0.2% to 15% from the viewpoints of increasing the pressure of the gas and facilitating the retention of the gas.

(Third Region)

The third region 133 faces the gas diffusion layer 120 and plays a role in supplying the gas to the entire surface of the gas diffusion layer 120 in high uniformity while suppressing an increase in pressure drop. Thus, the total area (third opening area S3) of openings (third openings 133a) of the third channel 133A on the plate surface 130A is larger than the first opening area S1 and the second opening area S2.

The placement of the third channel 133A is not particularly limited as long as the second channel 132A communicates with the third channel 133A and the third channel 133A is connected to the gas diffusion layer 120. In particular, preferably, the third openings 133a are evenly arranged on the entire plate surface 130A. That is, letting the ratio of the opening area of the third channel 133A in a central portion (130C, see FIG. 5C) to the area of the central portion 130C of the plate surface 130A be $R_{in}$ and letting the ratio of the opening area of the third channel 133A in the outer portion to the area of the outer portion of the plate surface 130A be $R_{out}$, the relationship 0.8 $R_{in}/R_{out}$ 1.2 is preferably satisfied. The central portion 130C is defined as a region including the central point C, the region being surrounded by a figure (similar to the plate surface 130A) formed by connecting midpoints of freely-selected straight lines that connect the central point C of the plate surface 130A and the outer edge. The outer portion refers to a region of the plate surface 130A other than the central portion 130C.

The shape of the third openings 133a may be, for example, a ring shape as illustrated in FIGS. 5A and 5B. In this case, the number of rings is not particularly limited and is, for example, 3 to 15. The shape of the third openings 133a may be a checkerboard pattern as illustrated in FIG. 5C. In the figure, a point C3 corresponds to the central point C of the plate surface 130A.

The percentage of the third opening area S3 with respect to the area of the plate surface 130A is not particularly limited and is preferably, for example, 10% to 75% in view of a reduction in the pressure drop of the gas.

The third region 133 may include a region (diffusion region, not illustrated) other than the region where the third channel 133A is provided. The diffusion region may be disposed between the second region 132 and the region where the third channel 133A is provided. The dispersion region includes a dispersion channel. The area of the opening of the dispersion channel facing the boundary surface only needs to be larger than the second opening area S2 at the boundary surface between the dispersion region and the region where the third channel 133A is provided, and may be equal to, smaller, or larger than the third opening area S3.

The thickness of each of the first region 131, the second region 132, and the third region 133 is not particularly limited.

The thickness is preferably minimized as much as possible because the paths of the gas are shortened. The thicknesses of the regions may be the same or different. The percentage of the thickness of each region with respect to the thickness of the gas channel plate 130 is not particularly limited. For example, the gas channel plate 130 has a thickness of 1.5 to 5 mm, and each region has a thickness of 0.2 to 1.5 mm.

Example of a material for the gas channel plate 130 include stainless steel, heat-resistant alloys such as nickel-based alloys, chromium-based alloys, and ceramics such as lanthanum chromite ($LaCrO_3$) in view of conductivity and heat resistance. In the case of a protonically conductive solid oxide fuel cell (PCFC), because the operating temperature is about 400° C. to about 600° C., inexpensive stainless steel can be used as the material of the gas channel plate 130. Different materials may be used for different regions.

A method for producing the gas channel plate 130 including the first region 131, the second region 132, and the third region 133 is not particularly limited as long as the opening area is changed in the thickness direction and the direction of flow of the gas is forcefully changed in the thickness direction. In particular, the gas channel plate 130 is preferably produced by forming predetermined through-holes in plate-like members and stacking these members in view of productivity and cost. That is, the gas channel plate 130 is preferably formed of the stack of the plate-like members.

In this case, the gas channel plate 130 can be produced by, for example, a method including the steps of providing a first plate-like member, a second plate-like member, and a third plate-like member, forming first through-holes, second through-holes, and third through-holes in the first plate-like member, the second plate-like member, and the third plate-like member, respectively, and stacking the first plate-like member, the second plate-like member, and the third plate-like member, which include these through-holes, in this order.

In this case, the first through-holes are formed so as to include slits extending in directions connecting the center of a main surface of the first plate-like member and its outer edge, the slits serving as openings formed on the main surface of the first plate-like member facing the second plate-like member. The through-holes are formed in such a manner that the relationships 2×s2<s1, and 5×s2<s3 are satisfied, where s1 represents the total area of openings of the first through-holes formed on the main surface of the first plate-like member, s2 represents the total area of openings of the second through-holes formed on a main surface of the second plate-like member facing the third plate-like member, and s3 represents the total area of openings of the third through-holes formed on a main surface of the third plate-like member facing away from the second plate-like member. The through-holes are preferably formed by press working in view of productivity. The through-holes may be or need not be perpendicular to both main surfaces of each plate-like member. In the case of the former, openings having the same shape and size are formed on both main surfaces of each plate-like member.

(Gas Diffusion Layer)

The gas diffusion layer 120 is a layer that supplies the gas to the first electrode 111 while the gas diffused through the gas channel plate 130 is further diffused. Here, the pressure drop across the gas diffusion layer 120 is higher than that across the gas channel plate 130. The gas diffusion layer 120 can also function as a current collector of the fuel cell 100.

The gas diffusion layer 120 is formed of a porous metal body having a three-dimensional mesh-like skeleton. The three-dimensional mesh-like structure refers to a structure in which, for example, rod-like or fibrous metal components are three-dimensionally connected together to form a network. Such a porous metal body has, for example, a non-woven fabric-like structure or sponge-like structure.

The gas diffusion layer 120 preferably has a porosity of 70% or more by volume, more preferably 80% or more by volume, particularly preferably 85% or more by volume in view of a pressure drop and gas diffusivity. The gas diffusion layer 120 has a porosity of less than 100% by volume and may have a porosity of 99.5% or less by volume or 99% or less by volume. These lower limits and the upper limits may be freely combined together. The porosity (% by volume) is determined by {1−(apparent specific gravity of gas diffusion layer 120/true specific gravity of metal contained in gas diffusion layer 120)}×100.

The metal contained in the gas diffusion layer 120 is not particularly limited. Examples of the metal include copper, copper alloys (alloys of copper and, for example, iron (Fe), nickel (Ni), silicon (Si), or manganese (Mn)), Ni, Ni alloys (alloys of Ni and, for example, tin (Sn), chromium (Cr), or tungsten (W)), aluminum (Al), Al alloys (alloys of Al and, for example, Fe, Ni, Si, or Mn), and stainless steel.

As a commercially available three-dimensional mesh-like porous metal body, "Celmet" (registered trademark) of copper or nickel or "Aluminum-Celmet" (registered trademark), available from Sumitomo Electric Industries Co., Ltd., can be used.

The gas diffusion layer 120 is preferably disposed so as to face an anode. That is, the first electrode 111 is preferably the anode. The anode usually contains nickel oxide as a catalytic component. When the anode is supplied with a fuel gas, a reduction reaction of nickel oxide occurs. The reduction reaction results in a slight decrease in the volume of the anode due to shrinkage. Here, if the fuel gas is unevenly supplied to the anode, the anode shrinks unevenly. In this case, stress concentrates on a portion of the anode that shrinks greatly; thus, the cell structure may be damaged. The gas diffusion layer 120 is disposed so as to face the anode, so that the fuel gas is supplied to the entire surface of the anode in high uniformity. Thus, variations in shrinkage of the anode are inhibited to inhibit damage to the cell structure 110.

The cell structure 110 is described below by an example in which the first electrode 111 is an anode and the second electrode 112 is a cathode.

(Cell Structure)

The cell structure 110 includes the anode 111, the cathode 112, and the electrolyte layer 113 interposed between the anode 111 and the cathode 112. The anode 111, the cathode 112, and the electrolyte layer 113 are integrated together by, for example, sintering. The cell structure 110 may be what is called an anode-supported type, in which the thickness of the anode 111 is larger than that of the cathode 112.

(Anode)

The anode 111 has an ionically conductive porous structure. For example, at the protonically conductive anode 111, a reaction in which a fuel such as hydrogen introduced from the manifold (not illustrated) is oxidized to release protons and electrons (an oxidation reaction of the fuel) occurs. The anode 111 may have a thickness of, for example, about 10 μm to about 1,000 μm.

As a material for the anode 111, for example, known materials used for anodes of fuel cells can be used. A specific example thereof is a composite oxide of a solid oxide exemplified below and nickel oxide (NiO) serving as a catalytic component. The anode 111 containing the composite oxide can be formed by, for example, mixing a NiO powder with the powdery metal oxide described above and sintering the resulting mixture.

Examples of the solid oxide include metal oxides such as zirconium dioxide doped with at least one selected from the group consisting of calcium, scandium, and yttrium (stabilized zirconia), yttrium-doped barium zirconate (BZY, $BaZr_{1-e}Y_eO_{3-\delta}$, $0.05 \leq e \leq 0.25$, and $\delta$ represents an oxygen vacancy concentration), yttrium-doped barium cerate (BCY, $BaCe_{1-f}Y_fO_{3-\delta}$, $0.05 \leq f \leq 0.25$, and $\delta$ represents an oxygen vacancy concentration), and an yttrium-doped mixed oxide of barium zirconate/barium cerate (BZCY, $BaZr_{1-g-h}Ce_gY_hO_{3-\delta}$, $0<g<1$, $0.05 \leq h \leq 0.25$, and $\delta$ represents an oxygen vacancy concentration).

(Cathode)

The cathode 112 has a porous structure on which oxygen molecules can be adsorbed, dissociated, and ionized. As a material for the cathode 112, for example, known materials used for cathodes of fuel cells can be used. A material for the cathode 112 is, for example, a compound containing lanthanum and having a perovskite structure. Specific examples thereof include lanthanum strontium cobalt ferrite (LSCF, $La_{1-a}Sr_aFe_{1-b}Co_bO_{3-\delta}$, $0.2 \leq a \leq 0.8$, $0.1 \leq b \leq 0.9$, and $\delta$ represents an oxygen vacancy concentration), lanthanum strontium manganite (LSM, $La_{1-c}Sr_cMnO_{3-\delta}$, $0.2 \leq c \leq 0.8$, and $\delta$ represents an oxygen vacancy concentration), and lanthanum strontium cobaltite (LSC, $La_{1-HR}Sr_{HR}CoO_{3-\delta}$, $0.2 \leq HR \leq 0.8$, and $\delta$ represents an oxygen vacancy concentration).

The cathode 112 may contain a catalyst such as nickel, iron, or cobalt. In the case where the catalyst is contained, the cathode can be formed by mixing the catalyst with the material described above and sintering the resulting mixture. The thickness of the cathode 112 is not particularly limited and may be about 5 μm to about 100 μm.

(Electrolyte Layer)

The electrolyte layer 113 contains an ionically conductive solid oxide. Ions that migrate in the electrolyte layer 113 are not particularly limited and may be oxide ions or hydrogen ions (protons). In particular, the electrolyte layer 113 preferably has proton conductivity. Protonically conductive solid oxide fuel cells (PCFCs) can operate in an intermediate temperature range of, for example, 400° C. to 600° C. Thus, PCFCs can be used for various applications. As the ionically conductive solid oxide, the metal oxides exemplified as solid oxides for the anode 111 can also be exemplified. Examples of a protonically conductive solid oxide include BZY, BCY, and BZCY.

(Method for Producing Cell Structure)

A method for producing the cell structure 110 is not particularly limited, and a known method can be employed. For example, the cell structure can be produced by a method including the steps of press-forming an anode material, depositing an electrolyte material containing a solid oxide on a side of the resulting anode green body and performing sintering, and depositing a cathode material on a surface of the sintered electrolyte material and performing sintering. In the case of the cell structure 110 thus produced, the anode 111, the electrolyte layer 113, and the cathode 112 are integrated together.

In the step of depositing the electrolyte material, for example, a paste prepared by mixing the powder of the electrolyte material with a water-soluble binder resin is applied to the side of the anode green body by, for example, screen printing, spray coating, spin coating, or dip coating. Similarly, the cathode material can also be deposited on the surface of the electrolyte.

The sintering of the electrolyte material is performed by heating the stack of the anode green body and the electrolyte material to, for example, 1,300° C. to 1,500° C. in an oxygen atmosphere. The oxygen concentration in the sintering atmosphere is not particularly limited, and may be 50% or more by volume or 60% or more by volume. The heating temperature is preferably 1,350° C. to 1,450° C. The sintering can be performed at atmospheric pressure or under pressure.

Before the electrolyte material is deposited, the anode material may be subjected to preliminarily sintering. The preliminary sintering may be performed at a lower temperature (for example, 900° C. to 1,100° C.) than the temperature at which the anode material is sintered. By performing the preliminary sintering, the electrolyte material is easily deposited.

Before the electrolyte material is sintered, a resin component such as a binder contained in each material may be removed. That is, after the cathode material is deposited, heating is performed at a relatively low temperature of about 500° C. to about 800° C. in air to remove the resin component contained in each material. Then the resulting stack may be heated to 1,300° C. to 1,500° C. in an oxygen atmosphere to sinter the materials.

In the sintering of the cathode material, the stack of the cathode material and the formed anode body including the electrolyte layer deposited thereon is sintered at, for example, 800° C. to 1,100° C. in an oxygen atmosphere. The oxygen concentration in the sintering atmosphere is not particularly limited and, for example, may be in the range described above. The sintering can be performed at atmospheric pressure or under pressure.

Here, the porous metal body having the three-dimensional mesh-like skeleton described above can also be appropriately used for the production of hydrogen by water electrolysis (electrolyzation) in addition to fuel cells. Methods for producing hydrogen are broadly categorized as follows: (1) an alkaline water electrolysis method using an alkaline aqueous solution, (2) a polymer electrolyte membrane (PEM) method, and (3) a solid oxide electrolysis cell (SOEC) method. The porous metal body can be used for any of the methods.

(1) In the alkaline water electrolysis method, water is electrolyzed by immersing an anode and a cathode in an alkaline aqueous solution (preferably a strongly alkaline aqueous solution) and applying a voltage between the anode and the cathode. In this case, the porous metal body is used as at least the anode. That is, an apparatus for producing hydrogen by the alkaline water electrolysis method includes an electrolytic bath that contains an alkaline aqueous solution, an anode and a cathode that are immersed in the electrolytic bath, and a power supply that applies a voltage between the anode and the cathode, at least one of the anode and the cathode including a porous metal body having a three-dimensional mesh-like skeleton. At the anode of the apparatus for producing hydrogen, hydroxyl ions are oxidized to form oxygen and water. At the cathode, hydrogen ions are reduced to generate hydrogen. Because the porous metal body has a large surface area, the area of contact between the porous metal body and the ions is large, thus improving the efficiency of water electrolysis. The porous metal body has good conductivity, thus further improving the efficiency of water electrolysis. Because the porous metal body has high porosity, hydrogen and oxygen generated can be rapidly detached. Also in this respect, the efficiency of water electrolysis should be improved.

A metal contained in the porous metal body is not particularly limited. Examples thereof include the same metals as the examples of the metal contained in the gas diffusion layer 120. In particular, the porous metal body used for the cathode preferably contains Ni or a Ni alloy because it is inexpensive and has a good ability to catalyze a hydrogen evolution reaction. The porous metal body used for the anode preferably contains platinum in view of catalytic activity.

The porous metal body preferably has a cell size of 100 µm or more and 5,000 µm or less. When the cell size of the porous metal body is in the range described above, hydrogen or oxygen generated at each electrode can be rapidly detached; thus, the electrolysis efficiency is further improved, and a sufficient area of contact between each electrode and hydrogen ions or hydroxyl ions can be ensured. From a similar point of view, the porous metal body preferably has a cell size of 400 µm or more and 4,000 µm or less. To achieve both good detachability of bubbles and a large contact area, a combination of the porous metal bodies having different cell sizes may be used as each electrode. Furthermore, a porous body composed of another metal may be used in combination with the porous metal body. The thickness and the mass (amount of metal) per unit area of the porous metal body may be appropriately set, depending on the scale of the production apparatus. For example, the thickness, the mass per unit area, and so forth may be set so as not to cause deformation or the like, depending on the area of a main surface of each electrode.

To prevent the mixing of hydrogen and oxygen generated, a separator is preferably disposed between the anode and the cathode. A material for the separator is not particularly limited and only needs to have wettability, ion permeability, alkali resistance, non-conductivity, non-air-permeability, thermal stability, and so forth. Examples of the material for the separator include fluororesins impregnated with potassium titanate, polyantimonic acid, polysulfone, hydrophilized polyphenylene sulfide, poly(vinylidene fluoride), and polytetrafluoroethylene. When stacked cells each including an anode, a cathode, and a separator are used, preferably, such separators are also disposed between the cells from the viewpoint of preventing a short circuit.

A solute for the alkaline aqueous solution is not particularly limited. Examples thereof include hydroxides and so forth of alkali metals (lithium, sodium, potassium, rubidium, cesium, and francium) and hydroxides and so forth of alkaline-earth metals (calcium, strontium, barium, and radium). Among these, hydroxides of alkali metals (in particular, NaOH and KOH) are preferred because strongly alkaline aqueous solutions are obtained. The concentration of the alkaline aqueous solution is not particularly limited and may be 20% to 40% by mass in view of electrolysis efficiency. The operating temperature is, for example, about 60° C. to about 90° C. The current density is, for example, about 0.1 to about 0.3 $A/cm^2$.

(2) The PEM method is a method for electrolyzing water with a polymer electrolyte membrane. Specifically, in the PEM method, water is electrolyzed by arranging an anode and a cathode on the respective sides of the polymer electrolyte membrane and applying a voltage between the anode and the cathode while water is introduced into the anode.

In this case, the porous metal body is used as at least the anode. That is, an apparatus for producing hydrogen by the PEM method (PEM-type hydrogen production apparatus) includes an anode, a cathode, and a polymer electrolyte membrane interposed between the anode and the cathode, and a power supply that applies a voltage between the anode and the cathode, the cathode at least including a porous metal body that has a three-dimensional mesh-like skeleton. The PEM method has the advantage that because the anode side and the cathode side are completely isolated by the polymer electrolyte membrane, hydrogen having higher purity than that in (1) alkaline water electrolysis method is produced. The porous metal body has a large surface area and good conductivity. Thus, the porous metal body can be appropriately used as an anode for use in the PEM-type hydrogen production apparatus.

Protons generated with the PEM-type hydrogen production apparatus move to the cathode through the polymer electrolyte membrane and are taken out as hydrogen on the side of the cathode. That is, although the PEM-type hydrogen production apparatus uses a completely opposite reaction that used in a polymer electrolyte fuel cell, in which hydrogen and oxygen are reacted to generate electricity and to discharge water, the apparatus has the same structure as the fuel cell. The PEM-type hydrogen production apparatus has an operating temperature of about 100° C. As the polymer electrolyte membrane, a protonically conductive polymer such as a perfluorosulfonic acid polymer, which has been used for solid polymer electrolyte fuel cells or PEM-type hydrogen production apparatuses, can be used. Preferably, the cathode also includes the porous metal body because hydrogen generated can be rapidly detached.

A metal contained in the porous metal body is not particularly limited. Examples thereof include the same metals as the examples of the metal contained in the gas diffusion layer 120. In particular, the porous metal body used for the anode preferably contains Ni or a Ni alloy because it is inexpensive and has a good ability to catalyze a hydrogen evolution reaction. The porous metal body used for the cathode preferably contains rhodium in view of catalytic activity.

The porous metal body preferably has a cell size of 100 μm or more and 5,000 μm or less. When the cell size of the porous metal body is in the range described above, hydrogen or oxygen generated at each electrode can be rapidly detached; thus, the electrolysis efficiency is further improved, and water retentivity are enhanced. In particular, if the anode has low water retentivity, water passes therethrough before water reacts sufficiently with the anode, thereby easily decreasing the electrolysis efficiency.

From a similar point of view, the porous metal body preferably has a cell size of 400 μm or more and 4,000 μm or less. A combination of the porous metal bodies having different cell sizes may be used as each electrode in consideration of the detachability of bubbles, water retentivity, and electrical connection. Furthermore, a porous body composed of another metal may be used in combination with the porous metal body.

The thickness and the mass per unit area of the porous metal body may be appropriately set, depending on the scale of the production apparatus. In particular, the thickness and the mass per unit area are preferably adjusted in such a manner that the porous metal body has a porosity of 30% or more. This is because the use of the porous metal body having a porosity of less than 30% increases the pressure drop when water flows through the porous metal body.

In this method, the polymer electrolyte membrane and both electrodes are subjected to pressure bonding to establish electrical continuity.

Thus, the mass per unit area is preferably adjusted in such a manner that an increase in electrical resistance due to the deformation and creep of both electrodes during the pressure bonding thereof is in the range where no problem arises in practical use. The mass of the porous metal body per unit area is preferably 400 $g/m^2$ or more.

(3) The SOEC method (also called as water vapor electrolysis method) is a method for electrolyzing water vapor with a solid oxide electrolyte membrane. Specifically, in the SOEC method, water is electrolyzed by arranging an anode and a cathode on the respective sides of the solid oxide electrolyte membrane and applying a voltage between the anode and the cathode while water vapor is introduced into one of the electrodes.

In the SOEC method, an electrode into which water vapor is introduced varies, depending on whether the solid oxide electrolyte membrane is proton conductive or oxide-ion conductive. When the solid oxide electrolyte membrane is oxide-ion conductive, water vapor is introduced into the cathode. The water vapor is decomposed at the cathode to generate protons and oxide ions. The protons generated are reduced at the cathode and taken out in the form of hydrogen. After the oxide ions move to the anode through the solid oxide electrolyte membrane, the oxide ions are oxidized at the anode and taken out in the form of oxygen. When the solid oxide electrolyte membrane is proton conductive, water vapor is introduced into the anode. The water vapor is decomposed at the anode to generate protons and oxide ions. After the protons generated move to the cathode thorough the solid oxide electrolyte membrane, the protons are reduced and taken out in the form of hydrogen. The oxide ions are oxidized at the anode and taken out in the form of oxygen.

In the SOEC method, the porous metal body is used as an electrode into which water vapor is introduced. That is, an apparatus for producing hydrogen by the SOEC method (SOEC-type hydrogen production apparatus) includes an anode, a cathode, a solid oxide electrolyte membrane interposed between the anode and the cathode, and a power supply that applies a voltage between the anode and the cathode, in which an electrode into which water vapor is introduced includes a porous metal body having a three-dimensional mesh-like skeleton. Because the porous metal body has a large surface area, the area of contact between water vapor and the electrode is large, thus improving the efficiency of water electrolysis. The porous metal body has good conductivity, thus further improving the electrolysis efficiency of water vapor.

From the viewpoint of easily producing high-pure hydrogen, the solid oxide electrolyte membrane is preferably proton conductive. This is because when the solid oxide electrolyte membrane is proton conductive, an electrode into which water vapor is introduced differs from an electrode from which hydrogen is taken. In this case, the porous metal body is used for the anode. From the viewpoint of rapidly detaching hydrogen generated, in this case, the cathode also preferably includes the porous metal body.

Although the SOEC-type hydrogen production apparatus uses a completely opposite reaction that used in a solid oxide fuel cell, in which hydrogen and oxygen are reacted to generate electricity and to discharge water, the apparatus has the same structure as the fuel cell. The SOEC-type hydrogen production apparatus has an operating temperature of about 600° C. to about 800° C. At the anode, oxygen is generated. Thus, the anode is placed in a high-temperature oxidizing atmosphere. The porous metal body has high oxidation resistance and thermal resistance and thus can be appropriately used for, in particular, the anode of the SOEC-type hydrogen production apparatus.

A metal contained in the porous metal body is not particularly limited. Examples thereof include the same metals as the examples of the metal contained in the gas diffusion layer 120. In particular, as the anode used in the oxidizing atmosphere, the porous metal body containing a Ni alloy that contains 3% to 30% by mass of a highly oxidation-resistant metal such as chromium (Cr) is preferably used. The porous metal body used for the cathode preferably contains Sn in view of electrical resistance.

The porous metal body preferably has a cell size of 100 μm or more and 5,000 μm or less. When the cell size of the porous metal body is in the range described above, the pressure drop of water vapor is in an appropriate range, thus increasing the electrolysis efficiency. When the porous metal body is used as the cathode, hydrogen generated can be rapidly detached. From a similar point of view, the porous metal body preferably has a cell size of 400 μm or more and 4,000 μm or less. A combination of the porous metal bodies having different cell sizes may be used as each electrode in consideration of the detachability of bubbles, water-vapor permeability, and electrical connection. Furthermore, a porous body composed of another metal may be used in combination with the porous metal body.

The thickness and the mass per unit area of the porous metal body may be appropriately set, depending on the scale of the hydrogen production apparatus. In particular, the thickness and the mass per unit area are preferably adjusted in such a manner that the porous metal body has a porosity of 30% or more. This is because the use of the porous metal body having a porosity of less than 30% increases the pressure drop when water flows through the porous metal body. In this method, the solid oxide electrolyte membrane and both electrodes are subjected to pressure bonding to establish electrical continuity. Thus, the mass per unit area is preferably adjusted in such a manner that an increase in electrical resistance due to the deformation and creep of both electrodes during the pressure bonding thereof is in the range where no problem arises in practical use.

The mass of the porous metal body per unit area is preferably 400 g/m$^2$ or more.

FIG. 6 is a schematic cross-sectional view of an SOEC-type hydrogen production apparatus 200 including a protonically conductive solid oxide electrolyte membrane. In FIG. 6, a power supply is omitted. The hydrogen production apparatus 200 includes a structure 210 including a solid oxide electrolyte membrane 213, electrodes 220A and 220B facing respective main surfaces of the structure 210, plate members 230A and 230B facing the respective main surfaces of the electrodes 220A and 220B away from the structure 210, and a power supply (not illustrated).

Each of the electrodes 220A and 220B is formed of a porous metal body having a three-dimensional mesh-like skeleton as described above. Each of the plate members 230A and 230B serves as a separator disposed in order not to mix water vapor, hydrogen, and oxygen, and includes a gas channel (not illustrated).

Water vapor V is introduced into the electrode 220A through the plate member 230A. That is, the electrode 220A serves as an anode, and the electrode 220B serves as a cathode.

The SOEC-type hydrogen production apparatus 200 has the same structure as the fuel cell 100 illustrated in FIG. 1, except that the electrode 220B, the plate member 230B, and the power supply are provided. That is, the structure 210 includes the solid oxide electrolyte membrane 213 containing a protonically conductive solid oxide, and porous layers 211 and 212 facing respective main surfaces thereof. The solid oxide electrolyte membrane 213 contains the same protonically conductive solid oxide as that exemplified for the electrolyte layer 113. The porous layers 211 and 212 support the solid oxide electrolyte membrane 213. The porous layer 211 located on the side of the anode (electrode 220A) is composed of a composite oxide of the solid oxide and nickel oxide (NiO) serving as a catalytic component, similarly to the anode 111. Thereby, the electrolysis efficiency is further enhanced. The porous layer 212 is composed of the same compound as that exemplified for the cathode 112.

The plate member 230A has the same structure as the gas channel plate 130. Thereby, a hydrogen production apparatus having good gas diffusion performance is provided. The structure of the plate member 230B is not particularly limited. The plate member 230B may have the same structure as the gas channel plate 130. Oxygen generated at the electrode 220A and unreacted water vapor may be taken out through the plate member 230A. Similarly, hydrogen generated at the electrode 220B may be taken out through the plate member 230B.

While the present invention will be more specifically described below by examples, the present invention is not limited to these examples.

Example 1

A fuel cell was produced by the following procedure.
(1) Production of Cell Structure A cell structure was produced by the following procedure.

BZY (BaZr$_{0.8}$Y$_{0.2}$O$_{2.9}$) was mixed with NiO to prepare a mixture containing 70% by volume Ni (catalytic component). The mixture was pulverized and mixed using a ball mill. Then the mixture was press-formed into a green body (thickness: 550 μm) for an anode. The green body was subjected to preliminary sintering at 1,000° C.

Subsequently, a paste containing BZY (BaZr$_{0.8}$Y$_{0.2}$O$_{2.9}$) and a water-soluble binder resin (ethyl cellulose) was applied to one surface of the green body by screen printing. The water-soluble binder resin was removed at 750° C. Then co-sintering was performed by heat treatment at 1,400° C. to form an anode and a solid electrolyte layer (thickness: 10 μm).

Subsequently, an LSCF paste containing an LSCF ($La_{0.6}HR_{0.4}Co_{0.2}Fe_{0.8}O_{3-\delta}$) powder serving as a material for a cathode and the organic solvent was applied to a surface of the solid electrolyte layer by screen printing and fired at 1,000° C. for 2 hours to produce a cell structure. The cathode had a thickness of 10 μm.

(2) Provision of Gas Channel Plate

Four circular plate-like members that were composed of stainless steel and that had a diameter of 100 mm and a thickness of 0.5 mm were provided.

The plate-like members were subjected to press working to form through-holes having openings (133a, 132a, 1311a, 1311b, and 1313a) as illustrated in FIGS. 7(a) to 7(d). The plate-like member P133 illustrated in FIG. 7(a) forms the third region 133. The plate-like member P132 illustrated in FIG. 7(b) forms the second region 132. The plate-like member P1313 illustrated in FIG. 7(d) serves as an auxiliary region and is combined with the plate-like member P1311 illustrated in FIG. 7(c) to form the first region 131.

In the plate-like members P1313 and P1311, the through-holes formed at the same positions had the same shapes.

Eleven slit-like auxiliary openings 1313a of the through-holes were arranged on a main surface of the plate-like member P1313. A slit 1311a was provided on a main surface of the plate-like member P1311, and five slits 1311b were arranged on each side of the slit 1311a and parallel to the slit 1311a. All the openings had lengths in the longitudinal direction of 34 mm, 50 mm, 66 mm, 82 mm, 94 mm, 82 mm, 94 mm, 82 mm, 66 mm, 50 mm, and 34 mm from an end and had a length in the lateral direction of 2 mm. Furthermore, through-holes (outlets 150) to discharge a gas into a manifold were formed in outer edges of the plate-like members P1311 and P1313.

The second openings 132a, spaced 15 mm apart, of the through-holes were entirely arranged on one main surface of the plate-like member P132, each of the second openings 132a being a square 2 mm on a side. The third openings 133a spaced 15 mm apart were arranged on one main surface of the plate-like member P133 in a checkerboard pattern, each of the third openings 133a being a square 7 mm on a side.

Figure 7:
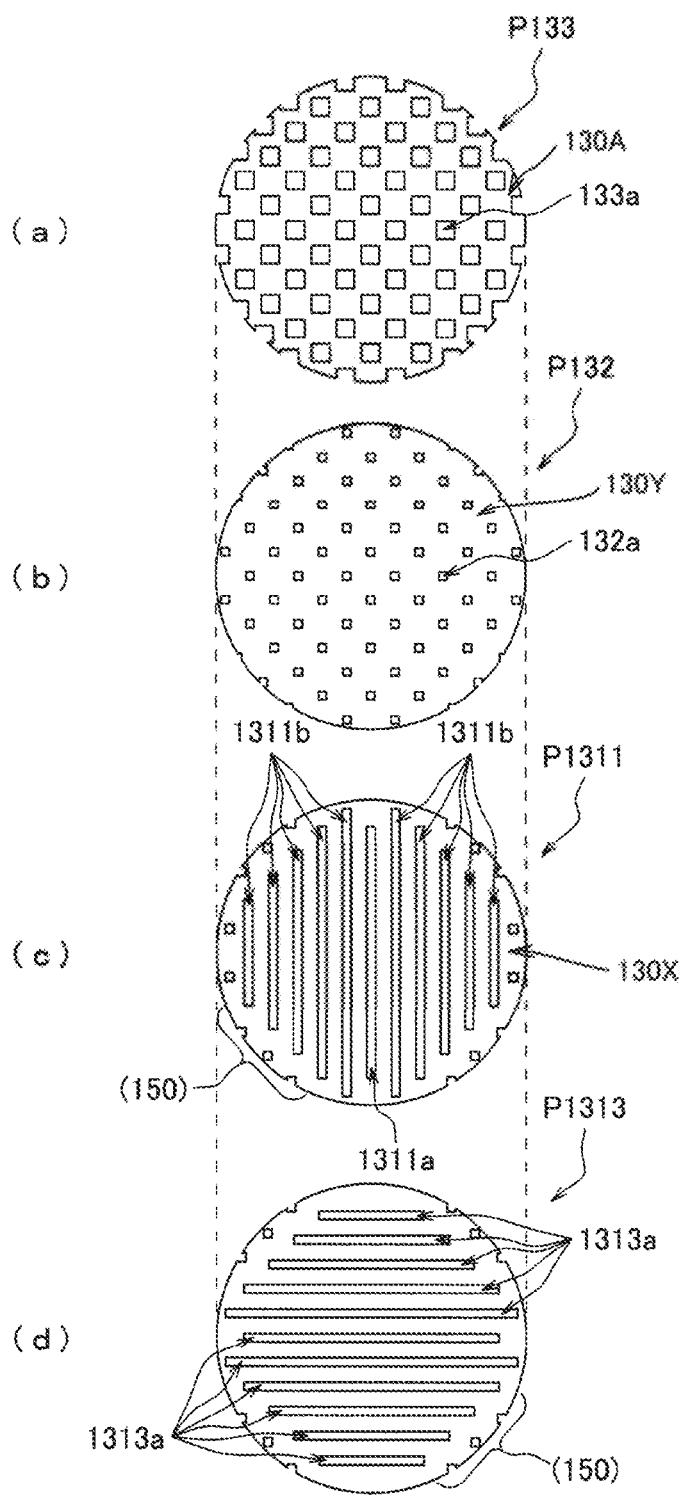
FIG. 7 is a top view illustrating the gas channel plate according to Example 1.

The plate-like members including the through-holes were stacked in the state and order illustrated in FIG. 7 to form a gas channel plate. The plate-like members P1313 and P1311 were stacked in such a manner that the angle formed by the center lines of the auxiliary openings 1313a and the center lines of the slits 1311a was 90°.

(3) Provision of Gas Diffusion Layer

A circular, three-dimensional mesh-like porous metal body (thickness: 1.4 mm, diameter: 100 mm) formed of Celmet (item No. 8) of nickel, available from Sumitomo Electric Industries Co., Ltd., was provided.

(4) Production of Fuel Cell

The gas diffusion layer and the gas channel plate were sequentially stacked on a surface of the anode of the cell structure produced as described above. A cathode-side interconnector formed of a single, stainless-steel plate-like member including a gas channel was stacked on a surface of the cathode to produce a fuel cell illustrated in FIG. 1.

(5) Evaluation of Gas Diffusivity

Figure 8:
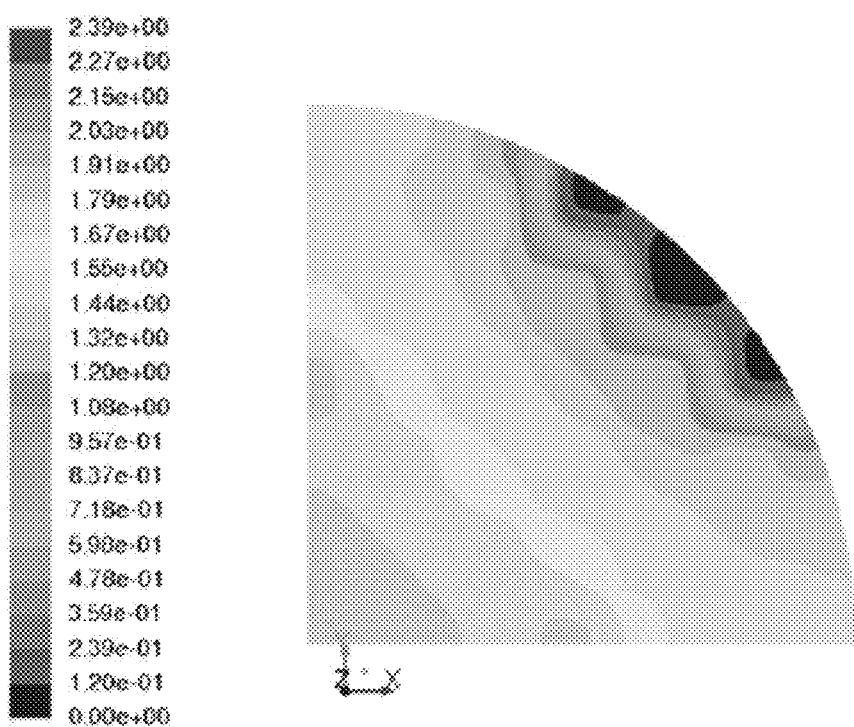
FIG. 8 is a graph illustrating the evaluation results of the gas diffusivity of a fuel cell according to Example 1.

The gas diffusivity was evaluated when hydrogen serving as a fuel gas was passed through the anode of the resulting fuel cell at 0.3 L/min and air was passed through the cathode at 1 L/min at an operating temperature of 600° C. The gas diffusivity was evaluated by the static pressure on the surface of the anode. FIG. 8 illustrates the results. FIG. 8 illustrates a static pressure distribution in the one-fourth of the surface of the anode (the same is true for FIGS. 10, 12, 14, 16, and 18A).

Example 2

A fuel cell was produced and evaluated as in Example 1, except that plate-like members including through-holes having openings (133a, 132a, 131a, 140, and 150) with shapes as illustrated in FIGS. 9(a) to 9(d) were used for the gas channel plate. FIG. 10 illustrates the results.

Figure 9:
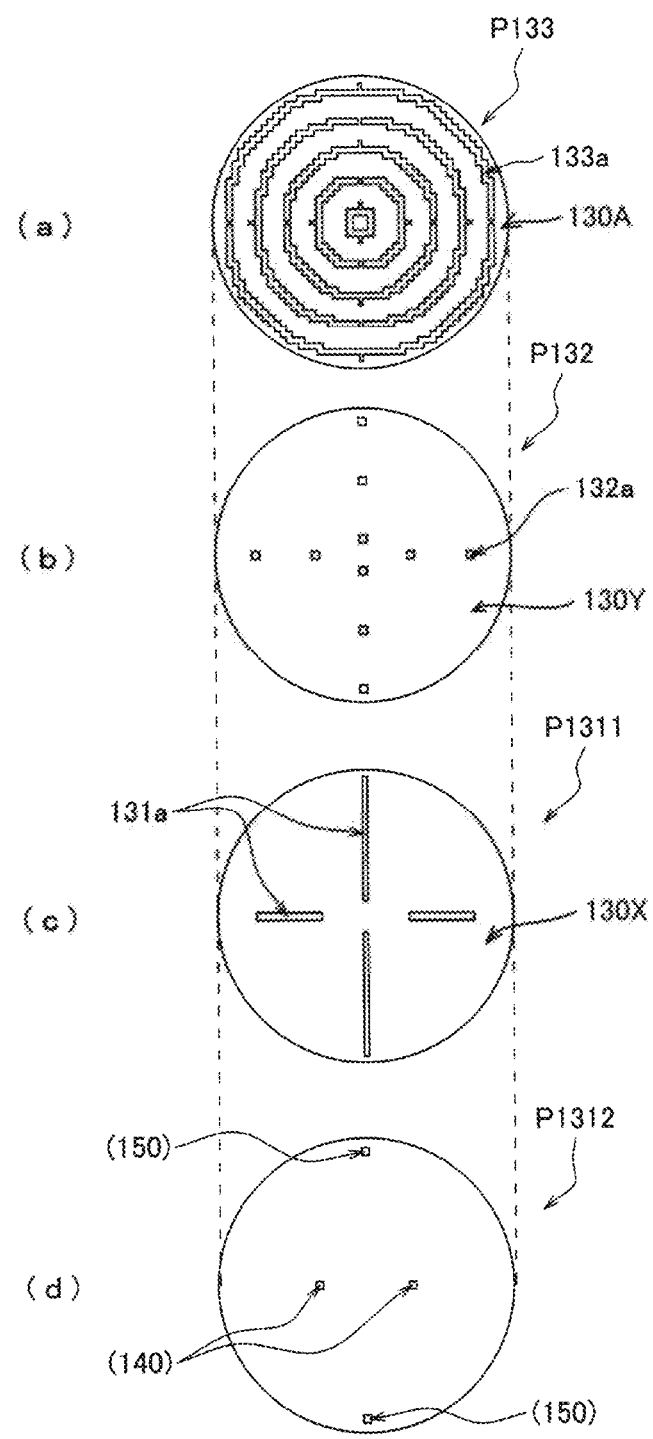
FIG. 9 is a schematic top view illustrating the structure of a gas channel plate according to Example 2.
Figure 10:
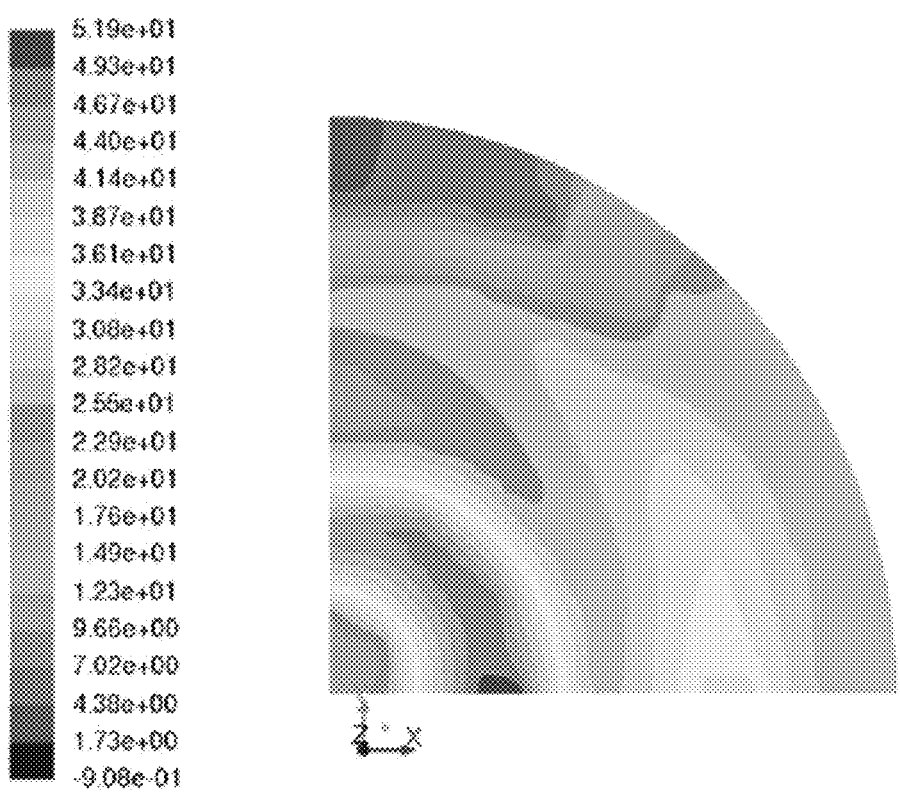
FIG. 10 is a graph illustrating the evaluation results of the gas diffusivity of a fuel cell according to Example 2.

The plate-like member P133 illustrated in FIG. 9(a) forms the third region 133. The plate-like member P132 illustrated in FIG. 9(b) forms the second region 132. The plate-like member P1312 illustrated in FIG. 9(d) serves as the reception region 1312 and is combined with the plate-like member P1311 illustrated in FIG. 9(c) to form the first region 131.

Two inlets 140, each being a square 2 mm on a side, were provided in the vicinity of the center of one main surface of the plate-like member P1312. The inlets 140 were spaced 32 mm apart from each other. Two through-holes (outlets) 150 used to discharge a gas into a manifold were provided at the outer edge of the plate-like member P1312. The distance from the center of the plate-like member P1312 to the center of each of the outlets 150 was 47 mm.

The first openings 131a were arranged at positions corresponding to the inlets 140 so as to radially divide the plate-like member P1311 into four divisions. The first openings 131a had lengths in the longitudinal direction of 47 mm, 39 mm, 47 mm, and 39 mm in clockwise order and each had a length in the lateral direction of 2 mm.

The second openings 132a, each being a square 2 mm on a side, were located at positions, corresponding to the first openings 131a, on one main surface of the plate-like member P132 as illustrated in FIG. 9(b). The second openings 132a arranged at positions corresponding to one of the first openings 131a were spaced 20 mm apart. Five ring-shaped third openings 133a were provided on one main surface of the plate-like member P133. The rings had inside radii of 3 mm, 13 mm, 23 mm, 33 mm, and 43 mm and each had a width of 2.4 mm. Each of the rings had two discontinuous portions for the sake of the press-working process. The plate-like members including the through-holes were stacked in the state and order illustrated in FIGS. 9(a) to 9(d) to form a gas channel plate.

Example 3

A fuel cell was produced and evaluated as in Example 1, except that plate-like members including through-holes having openings (133a, 132a, 131a, 140, and 150) with shapes as illustrated in FIGS. 11(a) to 11(d) were used for the gas channel plate. FIG. 12 illustrates the results.

Figure 11:
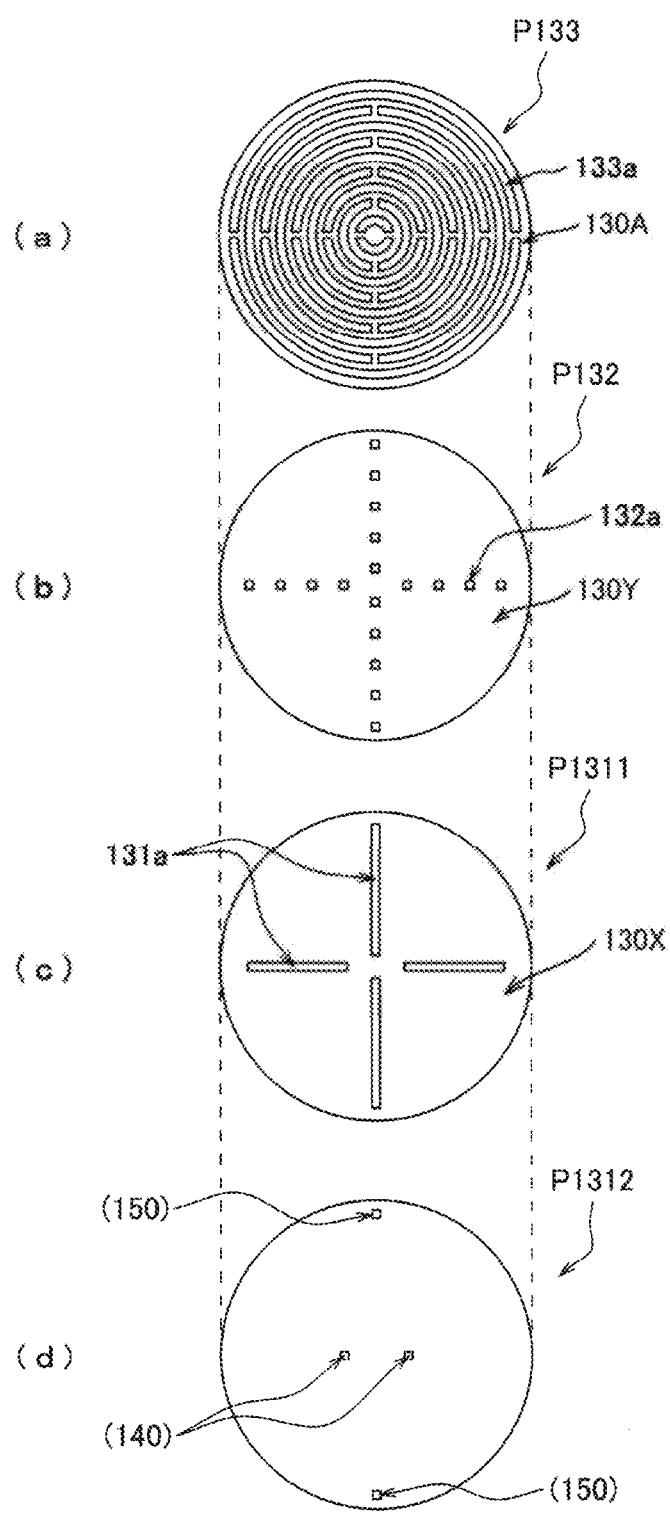
FIG. 11 is a schematic top view illustrating the structure of a gas channel plate according to Example 3.
Figure 12:
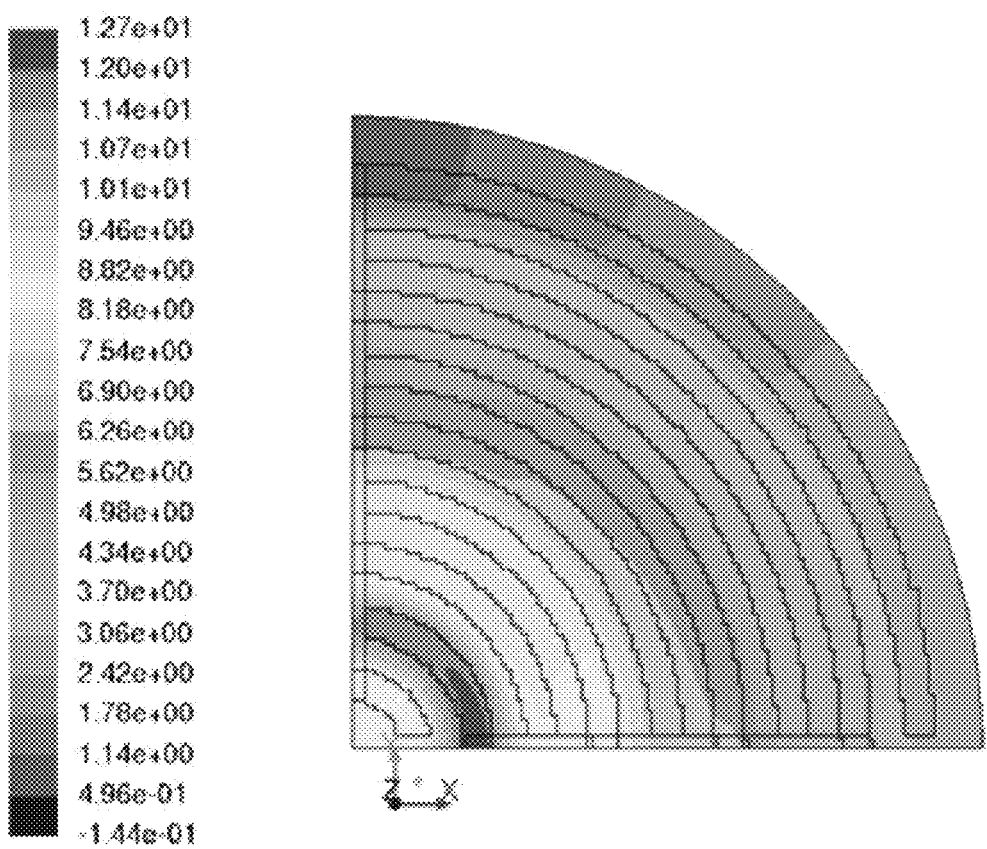
FIG. 12 is a graph illustrating the evaluation results of the gas diffusivity of a fuel cell according to Example 3.

The plate-like member P133 illustrated in FIG. 11(a) forms the third region 133. The plate-like member P132 illustrated in FIG. 11(b) forms the second region 132. The plate-like member P1312 illustrated in FIG. 11(d) serves as the reception region 1312 and is combined with the plate-like member P1311 illustrated in FIG. 11(c) to form the first region 131.

Two inlets 140, each being a square 2 mm on a side, were provided in the vicinity of the center of one main surface of the plate-like member P1312. The inlets 140 were spaced 20 mm apart from each other. Two through-holes (outlets) 150 used to discharge a gas into a manifold were provided at the outer edge of the plate-like member P1312. The distance from the center of the plate-like member P1312 to the center of each of the outlets 150 was 46.2 mm.

The first openings 131a were arranged at positions corresponding to the inlets 140 so as to radially divide the plate-like member P1311 into four divisions. The first openings 131a had lengths in the longitudinal direction of 42 mm, 32 mm, 42 mm, and 32 mm and each had a length in the lateral direction of 2 mm.

The second openings 132a, each being a square 2 mm on a side, were located at positions, corresponding to the first openings 131a, on one main surface of the plate-like member P132 as illustrated in FIG. 11(b). The second openings 132a arranged at positions corresponding to one of the first openings 131a were spaced 10 mm apart. Nine ring-shaped third openings 133a were provided on one main surface of the plate-like member P133. The rings had inside radii of 4.0 mm, 9.0 mm, 14.0 mm, 19.0 mm, 24.0 mm, 29.0 mm, 34.0 mm, 39.0 mm, and 44.0 mm and each had a width of 2.4 mm. Each of the rings had two discontinuous portions for the sake of the press-working process. The plate-like members including the through-holes were stacked in the order illustrated in FIGS. 11(a) to 11(d) to form a gas channel plate.

Example 4

Figure 13:
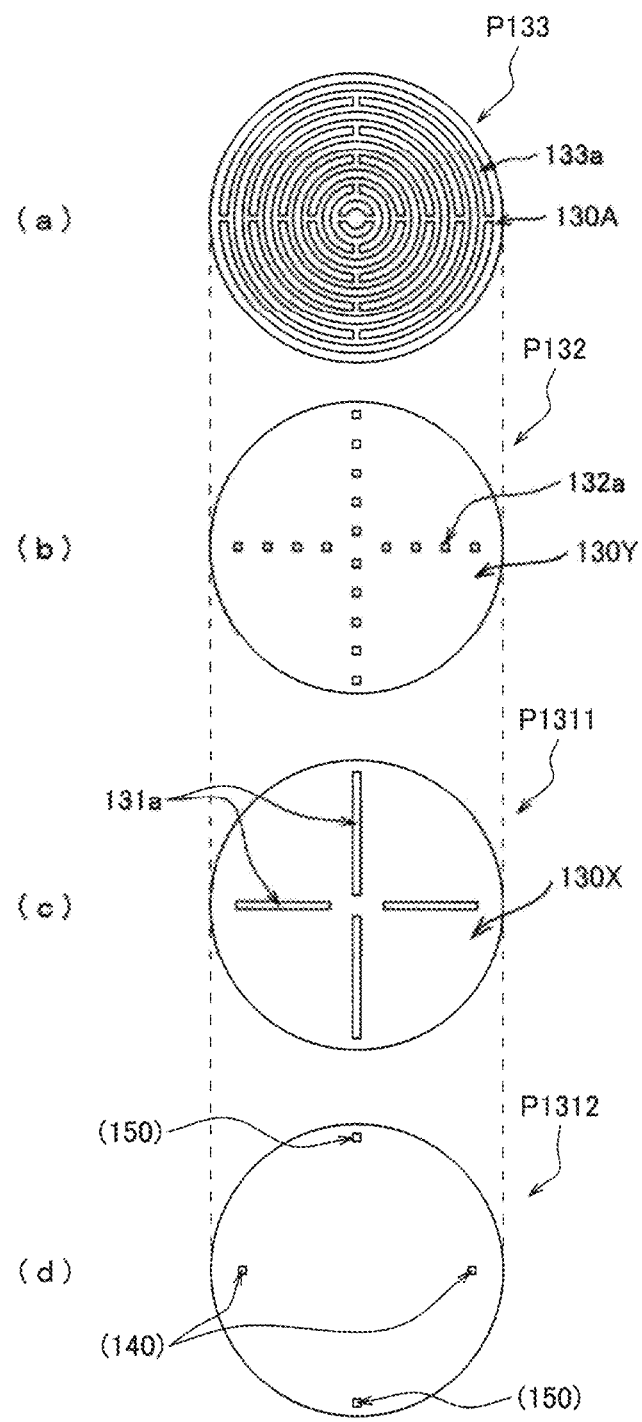
FIG. 13 is a schematic top view illustrating the structure of a gas channel plate according to Example 4.
Figure 14:
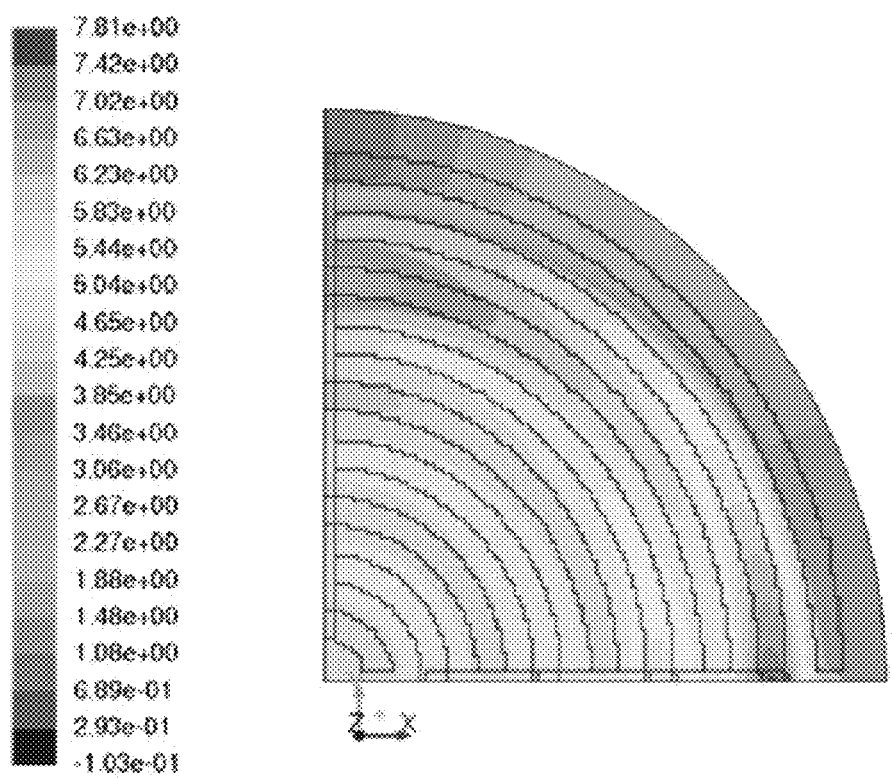
FIG. 14 is a graph illustrating the evaluation results of the gas diffusivity of a fuel cell according to Example 4.

A fuel cell was produced and evaluated as in Example 3, except that the plate-like member P1312 including the inlets 140 and the outlets 150 as illustrated in FIG. 13(d) was used as the reception region 1312. FIG. 14 illustrates the results. Two inlets 140, each being a square 2 mm on a side, were provided in the vicinity of the center of one main surface of the plate-like member P1312 and spaced 92.4 mm apart from each other. The distance from the center of the plate-like member P1312 to the center of each of the outlets 150 was 41 mm.

Example 5

Figure 15:
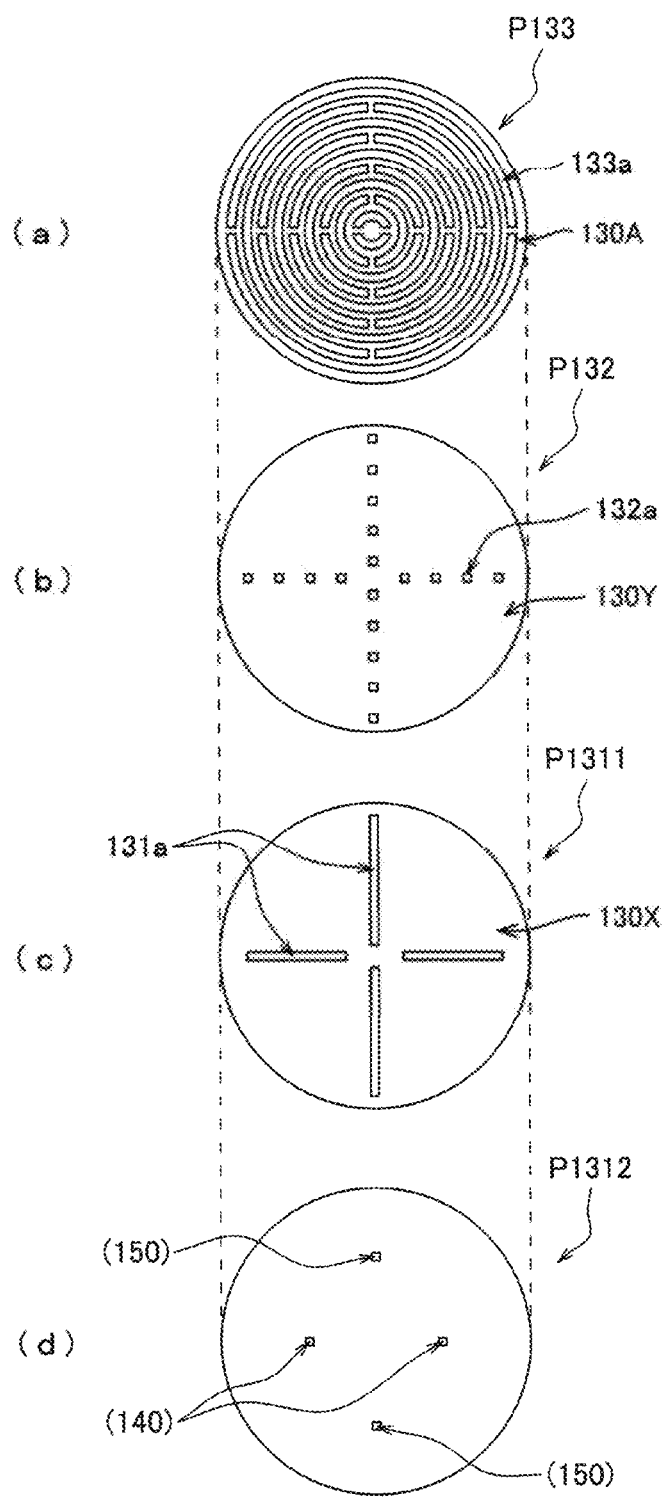
FIG. 15 is a schematic top view illustrating the structure of a gas channel plate according to Example 5.
Figure 16:
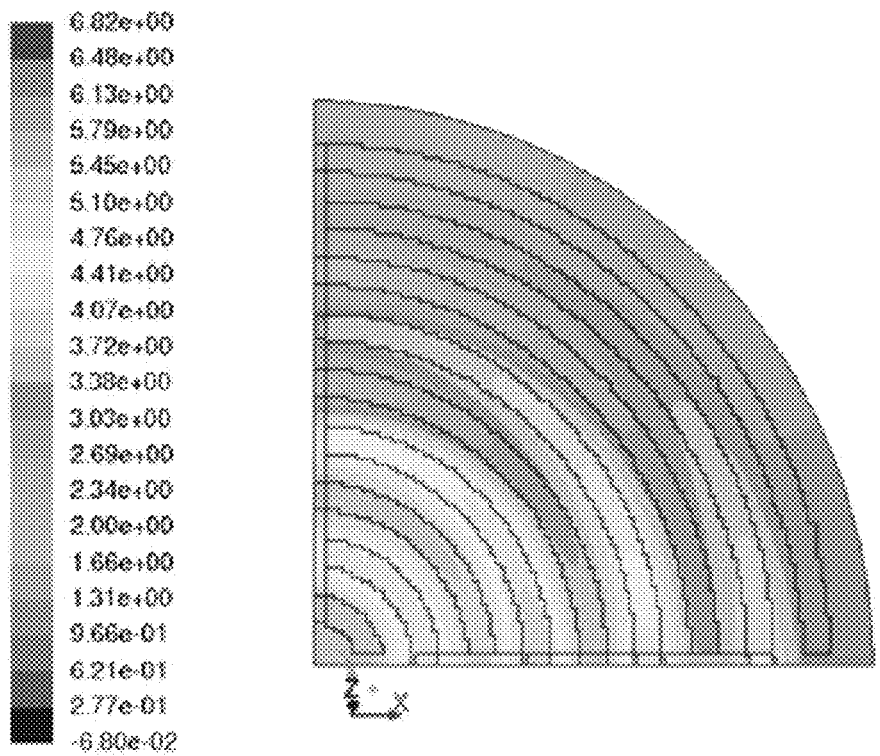
FIG. 16 is a graph illustrating the evaluation results of the gas diffusivity of a fuel cell according to Example 5.

A fuel cell was produced and evaluated as in Example 3, except that the plate-like member P1312 including the inlets 140 and the outlets 150 as illustrated in FIG. 15(d) was used as the reception region 1312. FIG. 16 illustrates the results. Two inlets 140, each being a square 2 mm on a side, were provided in the vicinity of the center of one main surface of the plate-like member P1312 and spaced 62 mm apart from each other. The distance from the center of the plate-like member P1312 to the center of each of the outlets 150 was 26.2 mm.

Comparative Example 1

Figure 17:
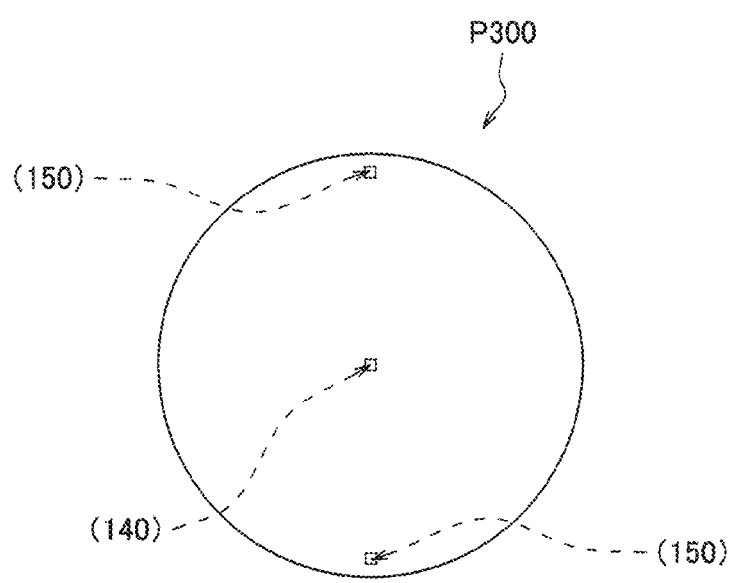
FIG. 17 is a schematic top view illustrating the structure of a gas channel plate according to Comparative example 1.
Figure 18A:
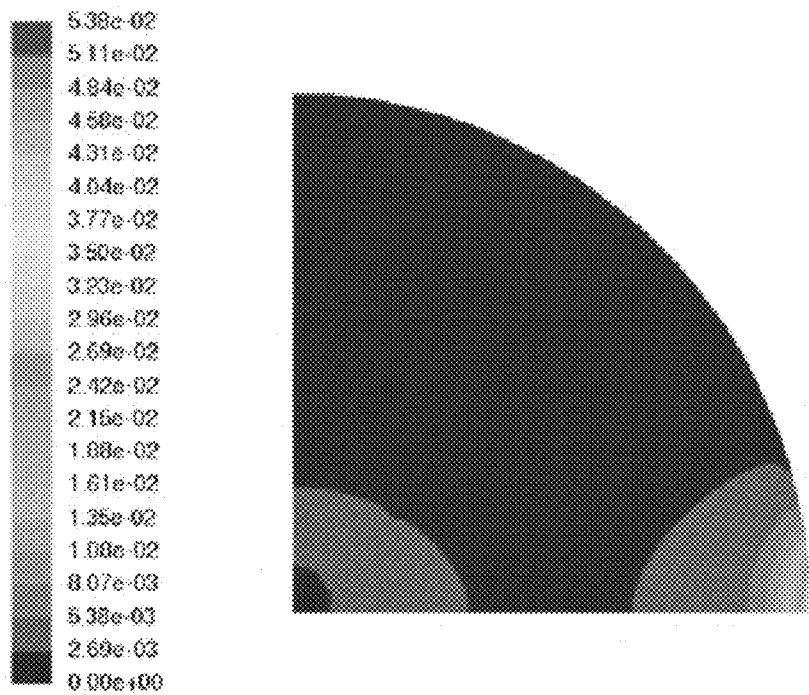
FIG. 18A is a graph illustrating the evaluation results of the gas diffusivity of a fuel cell according to Comparative example 1.
Figure 18B:
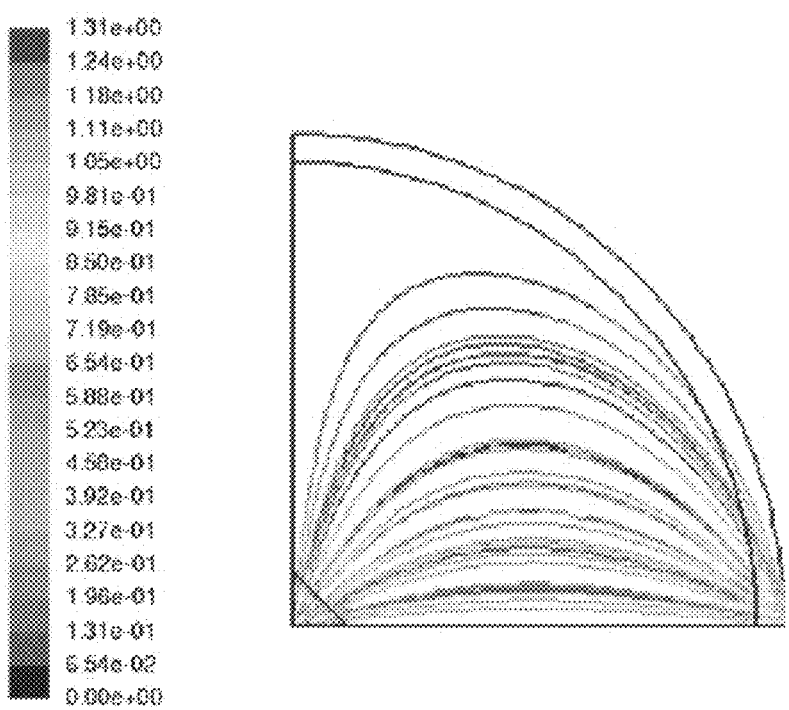
FIG. 18B is a graph illustrating the evaluation results of the gas diffusivity of a fuel cell according to Comparative example 1.

A fuel cell was produced and evaluated as in Example 1, except that a plate-like member P300 (opening ratio: 0.1%, thickness: 1 mm or less) illustrated in FIG. 17 was used as a gas channel plate. FIG. 18A illustrates the results. In addition, FIG. 18B illustrates the streamline of hydrogen gas in the one-fourth of the surface of the anode. The gas inlet 140 was located at a position corresponding to the center of the plate-like member P300. The outlets 150 were located at positions 47 mm away from the center of the plate-like member P300.

Examples 1 to 5 indicate that the arrangement of the first region to the third region in the gas channel plate permits the gas to be diffused to the outer edge of each gas channel plate. Furthermore, the difference in gas pressure in the planar direction of the gas channel plate is low. As is clear from Examples 3 to 5, the gas is diffused to the outer edge of each gas channel plate even when different arrangements of the inlets 140 and the outlets 150 for the gas are used. The static pressures estimated from Examples 1 to 5 correlate with the flow rates of the gas at the points and are higher than that in the comparative example throughout the gas channels. This indicates that in each of Examples 1 to 5, the gas is more diffused to the outer edge of the gas channel plate than that in the comparative example. That is, the fuel cell having the structure can have improved power generation efficiency because the gas is more distributed throughout the cell than that in conventional structures. Note that the static pressure is given in units of Pa.

REFERENCE SIGNS LIST 100 fuel cell, 110 cell structure, 111 first electrode (anode), 112 second electrode (cathode), 113 electrolyte layer, 120 gas diffusion layer,
130 gas channel plate, 130A, 130B plate surface, 130C central portion, 130X, 130Y boundary surface, 131 first region, 131A first channel, 131a first opening, 1311 formation region, 1311a, 1311b slit, 1312 reception region, 1313 auxiliary region, 1313A auxiliary channel, 1313a auxiliary opening, 132 second region, 132A second channel, 132a second opening, 133 third region, 133A third channel, 133a third opening,
140 inlet, 150 outlet, 200 hydrogen production apparatus, 210 structure, 211, 212 porous layer, 213 solid oxide electrolyte membrane, 220A, 220B electrode, 230A, 230B plate member

The invention claimed is:

1. A solid-oxide-electrolysis-cell-type hydrogen production apparatus comprising:
 a cell structure including a first electrode, a second electrode, and an electrolyte layer interposed between the first electrode and the second electrode, the electrolyte layer containing an ionically conductive solid oxide;
 a gas diffusion layer having a pair of main surfaces facing away from each other, the gas diffusion layer being disposed adjacent to the first electrode, a first main surface of the pair of main surfaces facing the first electrode, the gas diffusion layer supplying a gas to the first electrode; and
 a gas channel plate having a pair of plate surfaces facing away from each other, the gas channel plate being disposed adjacent to the gas diffusion layer, a first plate surface of the pair of plate surfaces facing a second main surface of the gas diffusion layer, the gas channel plate supplying the gas to the gas diffusion layer,
 wherein the gas diffusion layer is formed of a porous metal body having a three-dimensional mesh-like skeleton,
 the gas channel plate includes a first region, a second region, and a third region,
 the first region, the second region, and the third region are arranged in order of the first region, the second region, and the third region from a second plate surface of the gas channel plate toward the first plate surface of the gas channel plate in a thickness direction,
 a first channel extending through the first region in the thickness direction of the gas channel plate is provided in the first region,
 a second channel extending through the second region in the thickness direction of the gas channel plate is provided in the second region, a third channel extending through the third region in the thickness direction of the gas channel plate is provided in the third region, the first channel extends to the second plate surface of the gas channel plate and communicates with the second channel, the second channel communicates with the third channel, the third channel extends to the first plate surface of the gas channel plate and communicates with the gas diffusion layer, the first channel includes a slit extending from a center of the first plate surface toward an outer edge of the first plate surface at a boundary surface between the first region and the second region when viewed in a normal direction to the first plate surface, and letting a total area of the first channel at the boundary surface between the first region and the second region when viewed in the normal direction be a first opening area S1, letting a total area of the second channel at a boundary surface between the second region and the third region when viewed in the normal direction be a second opening area S2, and letting a total area of the third channel at a boundary surface between the third region and the second main surface of the gas diffusion layer when viewed in the normal direction be a third opening area S3, a relationship S2<S1<S3 is satisfied.

2. The solid-oxide-electrolysis-cell-type hydrogen production apparatus according to claim 1, wherein the second channel has a spot shape at the boundary surface between the second region and the third region when viewed in the normal direction to the first plate surface.

3. The solid-oxide-electrolysis-cell-type hydrogen production apparatus according to claim 1, wherein in the case where a region including a central point of the first plate surface of the gas channel plate is defined as a central portion, the region being surrounded by a figure formed by connecting points, the points lying on freely-selected straight lines drawn by connecting the central point and the outer edge, each of the points being located away from the central point by ¼ of a length of a corresponding one of the straight lines, letting a ratio of an opening area of the third channel in the central portion to an area of the central portion be $R_{in}$, and letting a ratio of an opening area of the third channel in an outer portion other than the central portion of the first plate surface of the gas channel plate to an area of the outer portion be $R_{out}$, a relationship $0.8 \leq R_{in}/R_{out} \leq 1.2$ is satisfied.

4. The solid-oxide-electrolysis-cell-type hydrogen production apparatus according to claim 1, wherein the first region is formed of a first plate-like member, the second region is formed of a second plate-like member, and the third region is formed of a third plate-like member, and the gas channel plate is formed of a stack of the first plate-like member, the second plate-like member, and the third plate-like member.

5. The solid-oxide-electrolysis-cell-type hydrogen production apparatus according to claim 1, wherein the porous metal body has a porosity of 85% or more by volume.

6. The solid-oxide-electrolysis-cell-type hydrogen production apparatus according to any one of claim 1, wherein the first electrode is an anode.

* * * * *